United States Patent
Mayya et al.

(10) Patent No.: US 10,129,321 B2
(45) Date of Patent: Nov. 13, 2018

(54) SYSTEM AND METHOD FOR SHARING ELECTRONIC NEWS ITEMS

(71) Applicant: BLACKBERRY LIMITED, Waterloo (CA)

(72) Inventors: Niranjan Mayya, Mississauga (CA); Jay David Steele, Halifax (CA); Jon-David Kenneth Lacey, Upper Tantallon (CA); Peter Hantzakos, North York (CA)

(73) Assignee: BlackBerry Limited, Waterloo, Ontario (CA)

( * ) Notice: Subject to any disclaimer, the term of this patent is extended or adjusted under 35 U.S.C. 154(b) by 313 days.

(21) Appl. No.: 13/659,208

(22) Filed: Oct. 24, 2012

(65) Prior Publication Data

US 2013/0151993 A1    Jun. 13, 2013

Related U.S. Application Data

(60) Provisional application No. 61/568,879, filed on Dec. 9, 2011.

(51) Int. Cl.
*G06F 15/16* (2006.01)
*G06F 3/01* (2006.01)
(Continued)

(52) U.S. Cl.
CPC .......... *H04L 67/02* (2013.01); *H04L 12/1859* (2013.01); *H04L 51/046* (2013.01)

(58) Field of Classification Search
CPC . H04L 12/581; H04L 29/08072; H04L 51/04; G06Q 10/10; G06Q 10/107;
(Continued)

(56) References Cited

U.S. PATENT DOCUMENTS 7,185,285 B2 *   2/2007   Van Dok et al. ............. 715/753
7,240,093 B1 *   7/2007   Danieli et al. .............. 709/205
(Continued)

OTHER PUBLICATIONS

Lopez Monclus, I.; Search Report from corresponding European Application No. 12196239.3; search completed May 10, 2013.
(Continued)

*Primary Examiner* — Jennifer To
*Assistant Examiner* — Jasmine Wan
(74) *Attorney, Agent, or Firm* — Thomas Grzesik; Fleit Gibbons Gutman Bongini & Bianco P.L.

(57) ABSTRACT

A system and method are provided for sending a first message to a recipient using a messaging channel, the message including information identifying an electronic news article provided by a data channel; receiving a second message from the recipient over the messaging channel, the second message having been composed in a news application; and displaying the second message in association with the electronic news article in the news application. A system and method are also provided for receiving a first message from a sender over a messaging channel, the message including information identifying an electronic news article provided by a data channel; obtaining the electronic news article using the data channel; enabling a second message to be composed in a news application displaying the electronic news article; and sending the second message to the sender using the messaging channel.

18 Claims, 17 Drawing Sheets

(51) Int. Cl.
*H04L 29/08* (2006.01)
*H04L 12/18* (2006.01)
*H04L 12/58* (2006.01)

(58) Field of Classification Search
CPC ........ G06Q 10/06; G06Q 30/02; G06F 15/16; G06F 17/30876
USPC ............. 715/756; 709/203, 205, 227; 707/5; 705/7.21, 14.4
See application file for complete search history.

(56) References Cited

U.S. PATENT DOCUMENTS

| | | | |
|---|---|---|---|
| 7,664,861 B2* | 2/2010 | Guntupalli et al. ........... 709/227 |
| 7,735,101 B2* | 6/2010 | Lanza ............... G06F 17/30817 709/246 |
| 7,929,986 B2* | 4/2011 | Kuwahara et al. ........ 455/550.1 |
| 8,001,187 B2* | 8/2011 | Stochosky .................... 709/205 |
| 8,209,376 B1* | 6/2012 | Stochosky .................... 709/203 |
| 8,443,041 B1* | 5/2013 | Krantz .................... H04L 51/04 709/204 |
| 8,468,562 B2* | 6/2013 | Miller .................... G06Q 30/02 705/14.4 |
| 2004/0122896 A1* | 6/2004 | Gourraud ...................... 709/204 |
| 2005/0266835 A1* | 12/2005 | Agrawal et al. ........... 455/414.3 |
| 2006/0277481 A1* | 12/2006 | Forstall ............. G06F 17/30899 715/764 |
| 2007/0118802 A1* | 5/2007 | Gerace et al. ................. 715/738 |
| 2007/0150608 A1 | 6/2007 | Randall et al. |
| 2008/0005751 A1* | 1/2008 | Chandra ........... G06F 17/30896 719/328 |
| 2008/0065732 A1* | 3/2008 | Kulkarni et al. ............. 709/206 |
| 2008/0146204 A1 | 6/2008 | Gu et al. |
| 2008/0163202 A1* | 7/2008 | Kembel et al. ............... 717/178 |
| 2008/0177600 A1* | 7/2008 | McCarthy et al. ................ 705/7 |
| 2008/0201437 A1 | 8/2008 | Ludwig et al. |
| 2009/0125511 A1* | 5/2009 | Kumar ............................. 707/5 |
| 2009/0158176 A1* | 6/2009 | Kalaboukis et al. ......... 715/758 |
| 2009/0210802 A1* | 8/2009 | Hawkins et al. ............. 715/753 |
| 2009/0234876 A1* | 9/2009 | Schigel et al. ................ 707/102 |
| 2009/0305732 A1* | 12/2009 | Marcellino et al. .......... 455/466 |
| 2010/0050092 A1* | 2/2010 | Williams et al. ............. 715/753 |
| 2010/0159883 A1 | 6/2010 | Pascal et al. |
| 2010/0250322 A1* | 9/2010 | Norwood ............... G06Q 10/06 705/7.21 |
| 2011/0010340 A1 | 1/2011 | Huang et al. |
| 2011/0060835 A1* | 3/2011 | Dorso et al. .................. 709/227 |
| 2011/0090898 A1* | 4/2011 | Patel ...................... H04L 12/66 370/352 |
| 2011/0161440 A1* | 6/2011 | Juvet ................. G06F 17/30876 709/206 |
| 2011/0225368 A1 | 9/2011 | Burge, III |
| 2012/0110429 A1* | 5/2012 | Tzonis ................... G06Q 10/10 715/230 |
| 2012/0151383 A1* | 6/2012 | Kazan et al. ................. 715/753 |
| 2012/0290601 A1* | 11/2012 | Huang .......................... 707/769 |
| 2014/0143228 A1* | 5/2014 | Blue et al. .................... 707/709 |

OTHER PUBLICATIONS

Danielson, S.; Turntable.fm: A Creative Twist on Social Music; Sep. 21, 2011; http://web.appstorm.net/reviews/media-reviews/turntable-fm-a-creative-twist-on-social-music/.

Constine, J.; Facebook Launches "Listen With" for Turntable.fm-style Simultaneous Music and Chat; Jan. 12, 2012; http://techcrunch.com/2012/01/12/facebook-listen-with/.

Huang, N.; Search Report from corresponding PCT Application No. PCT/CA2012/050758; search completed Nov. 22, 2012.

\* cited by examiner

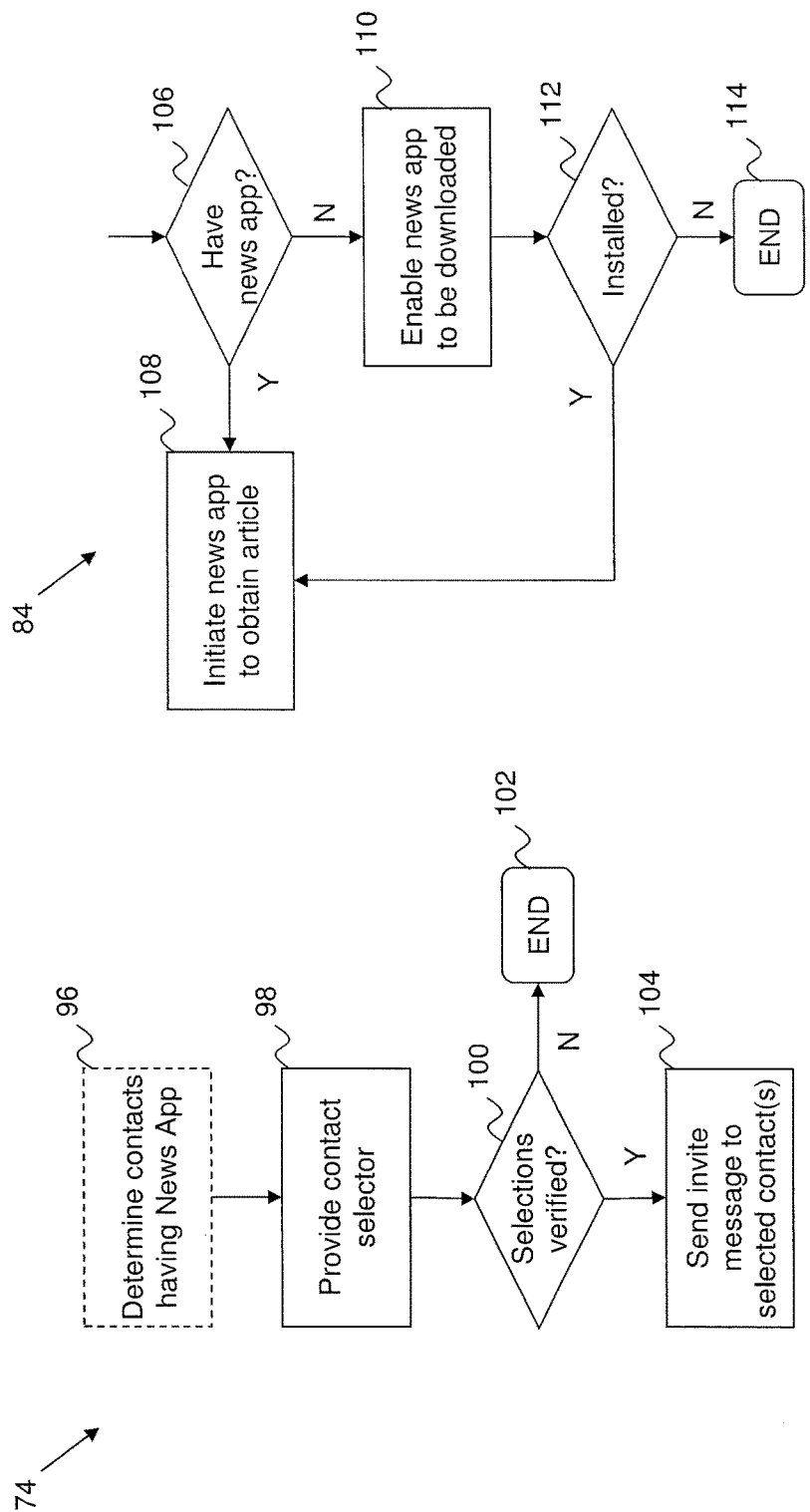

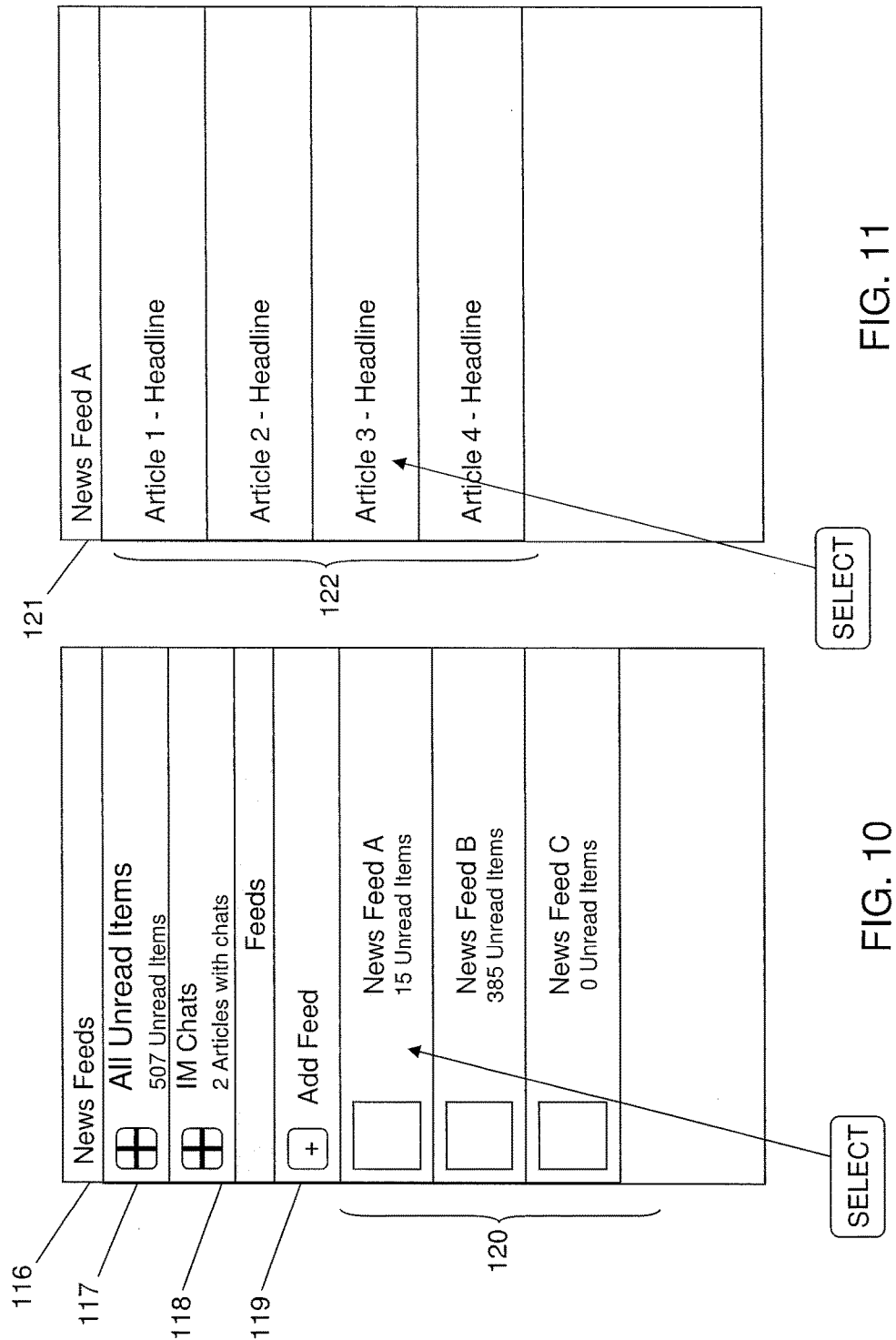

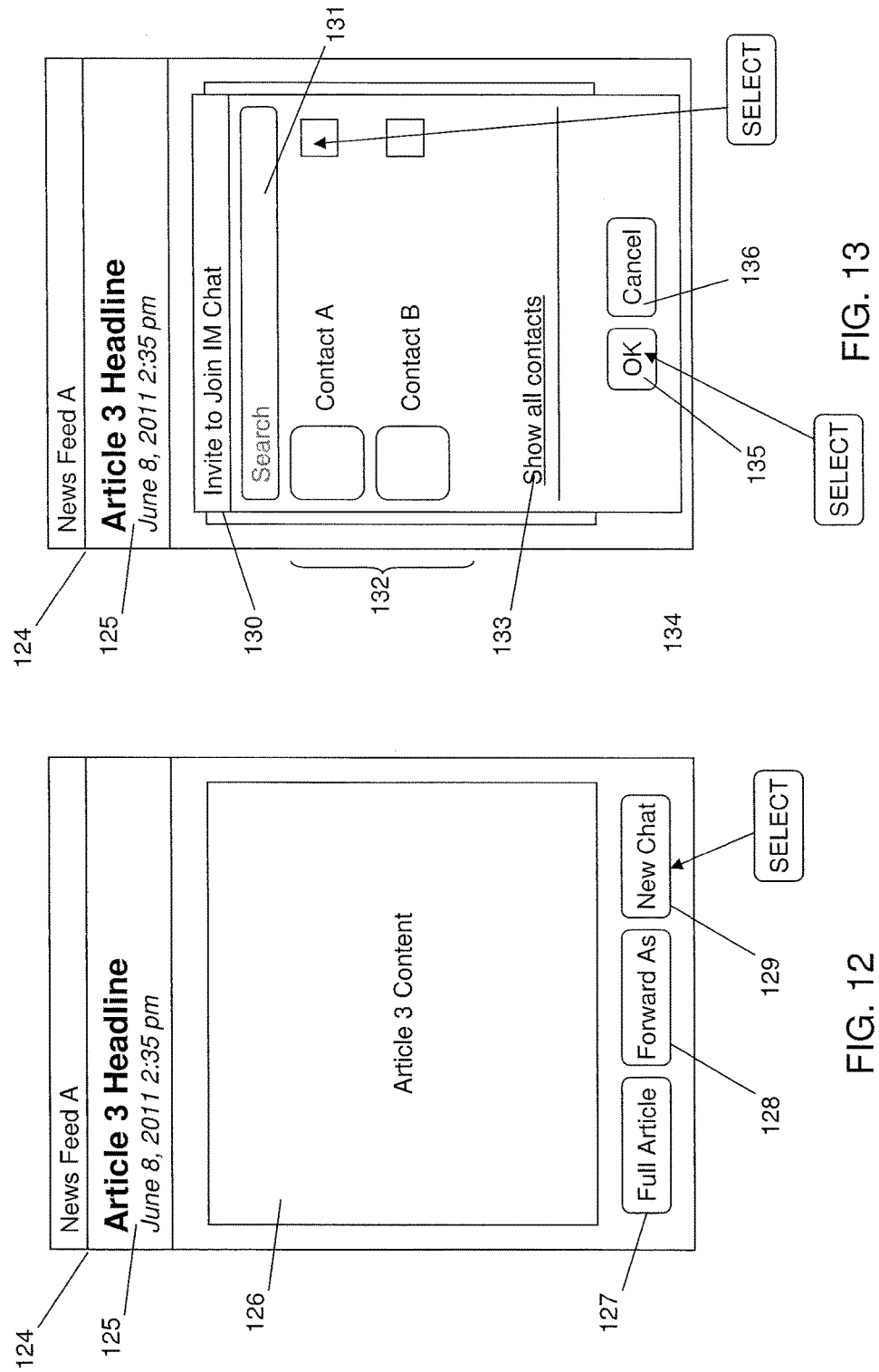

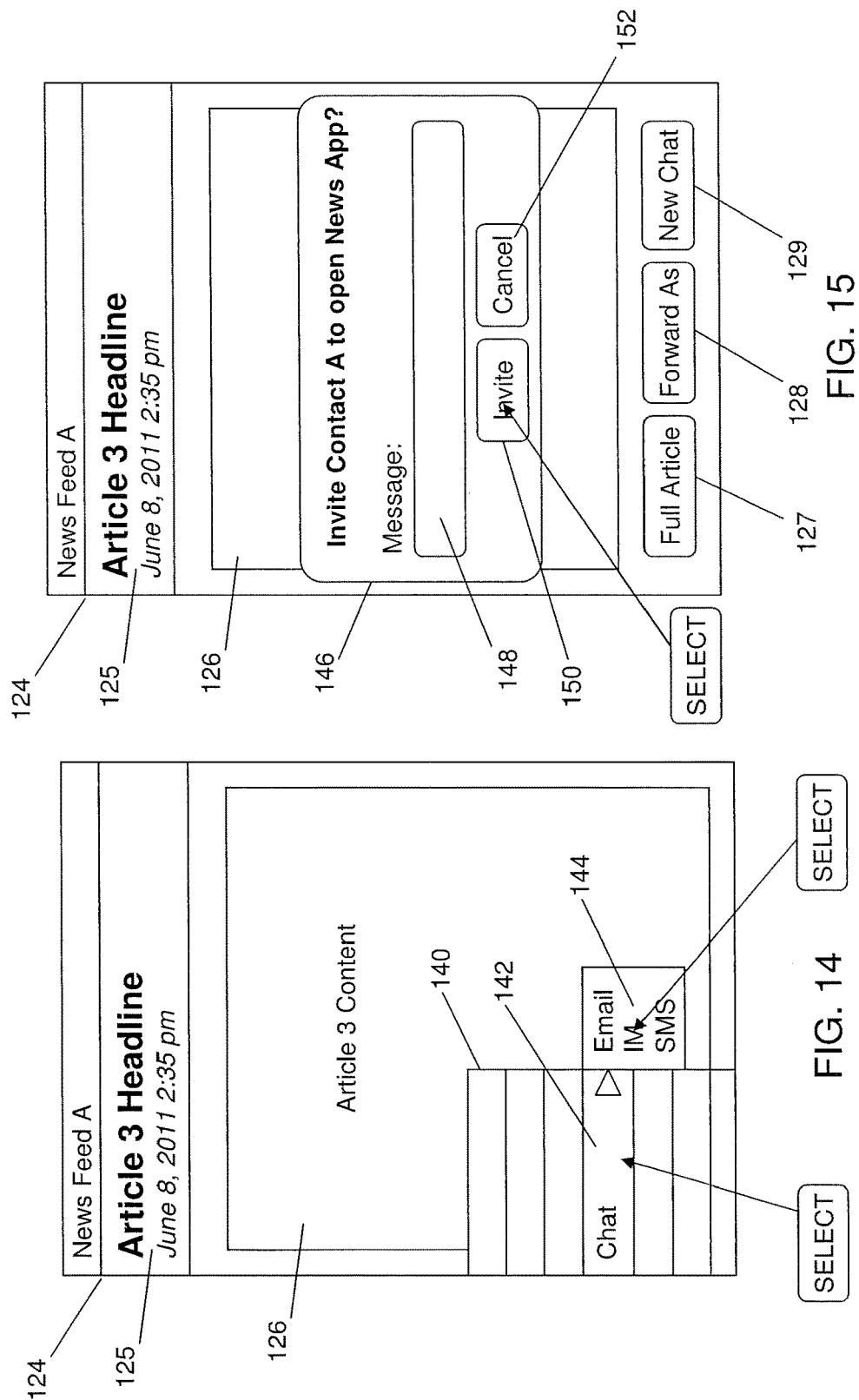

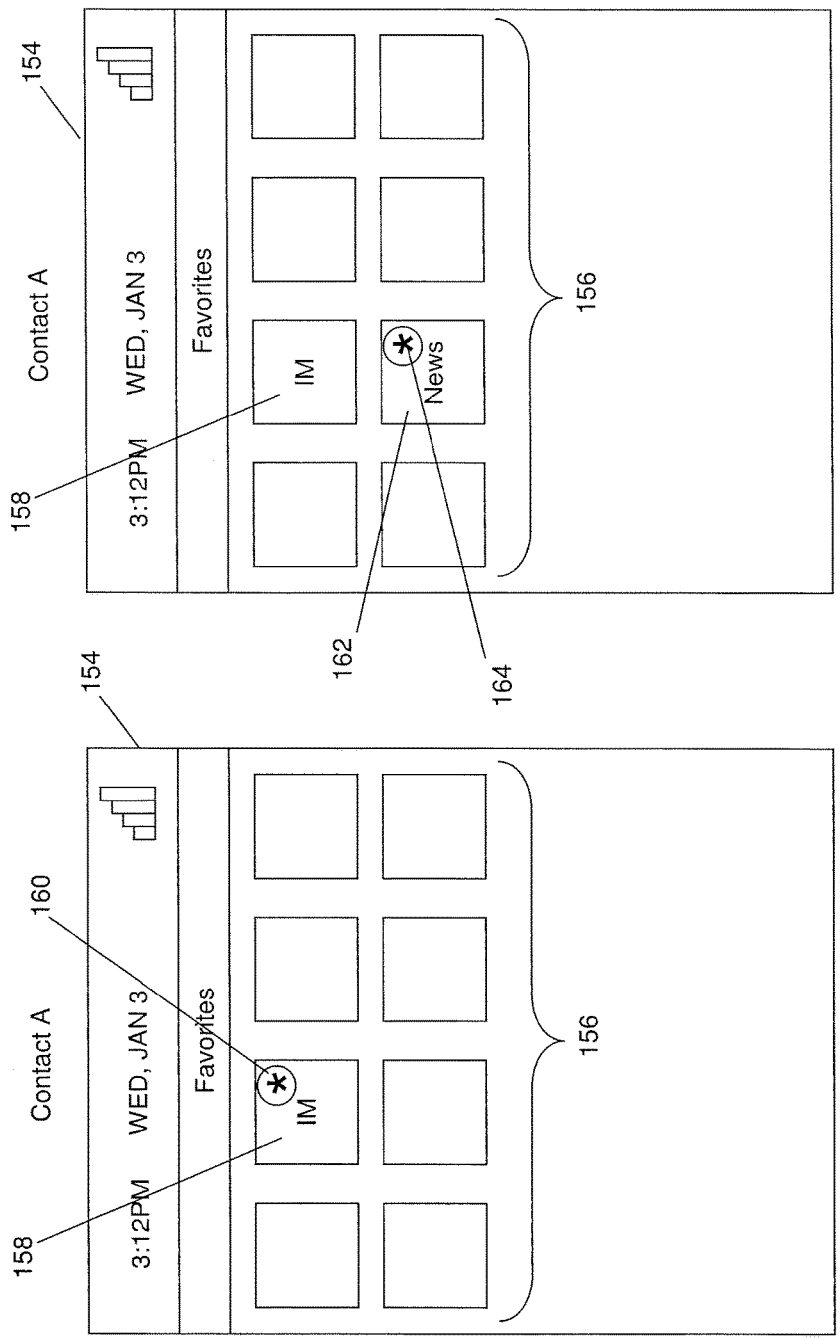

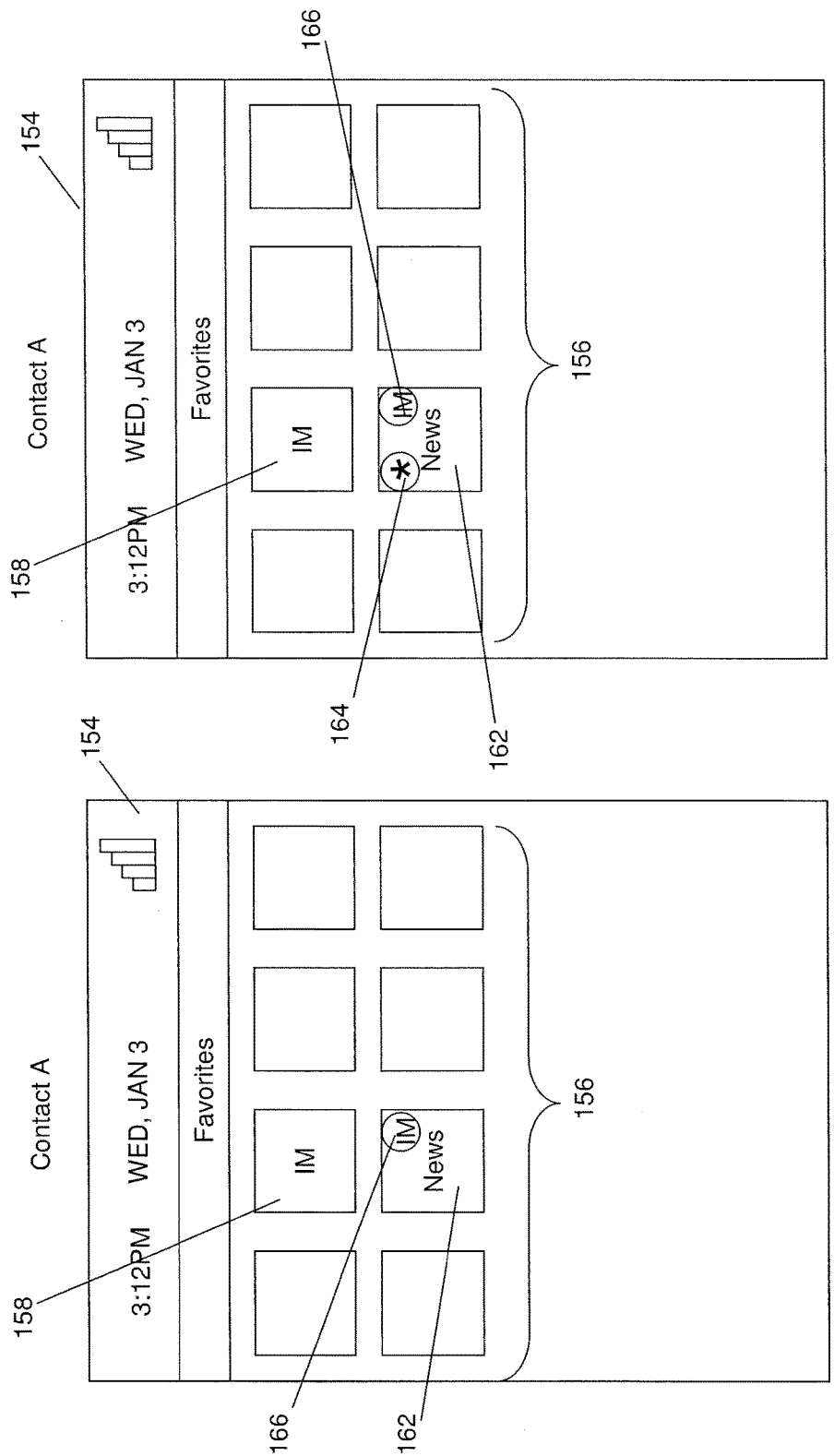

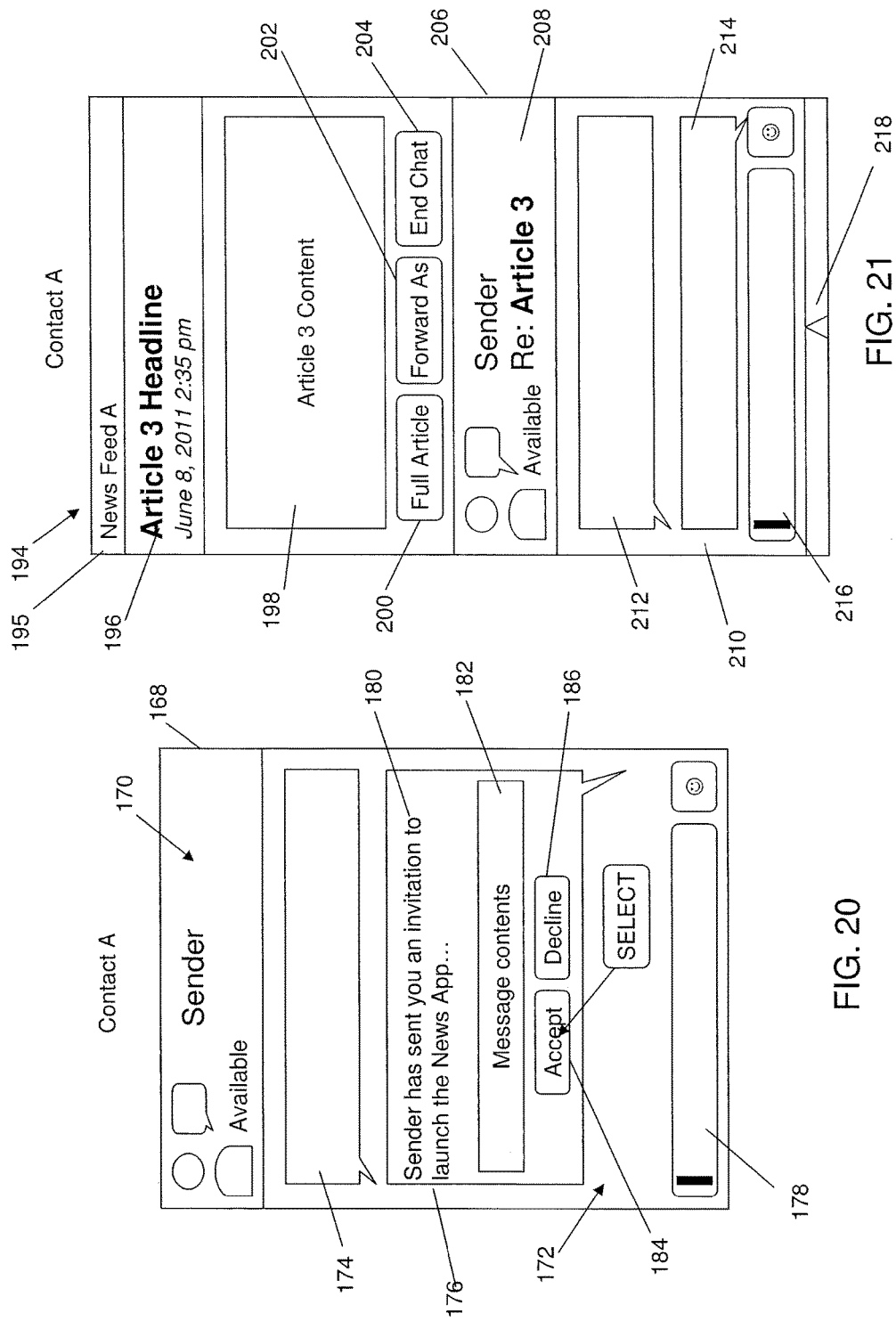

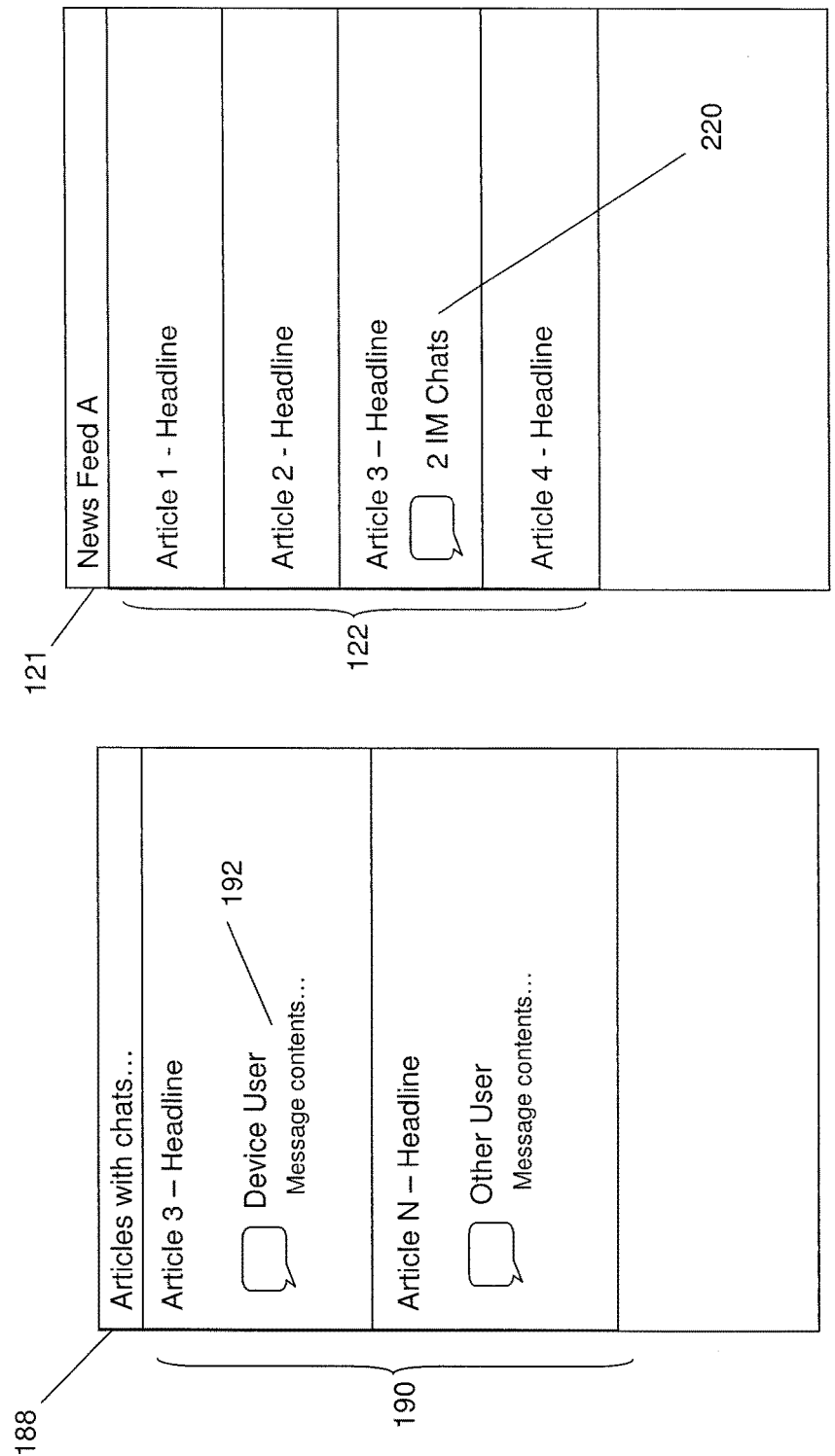

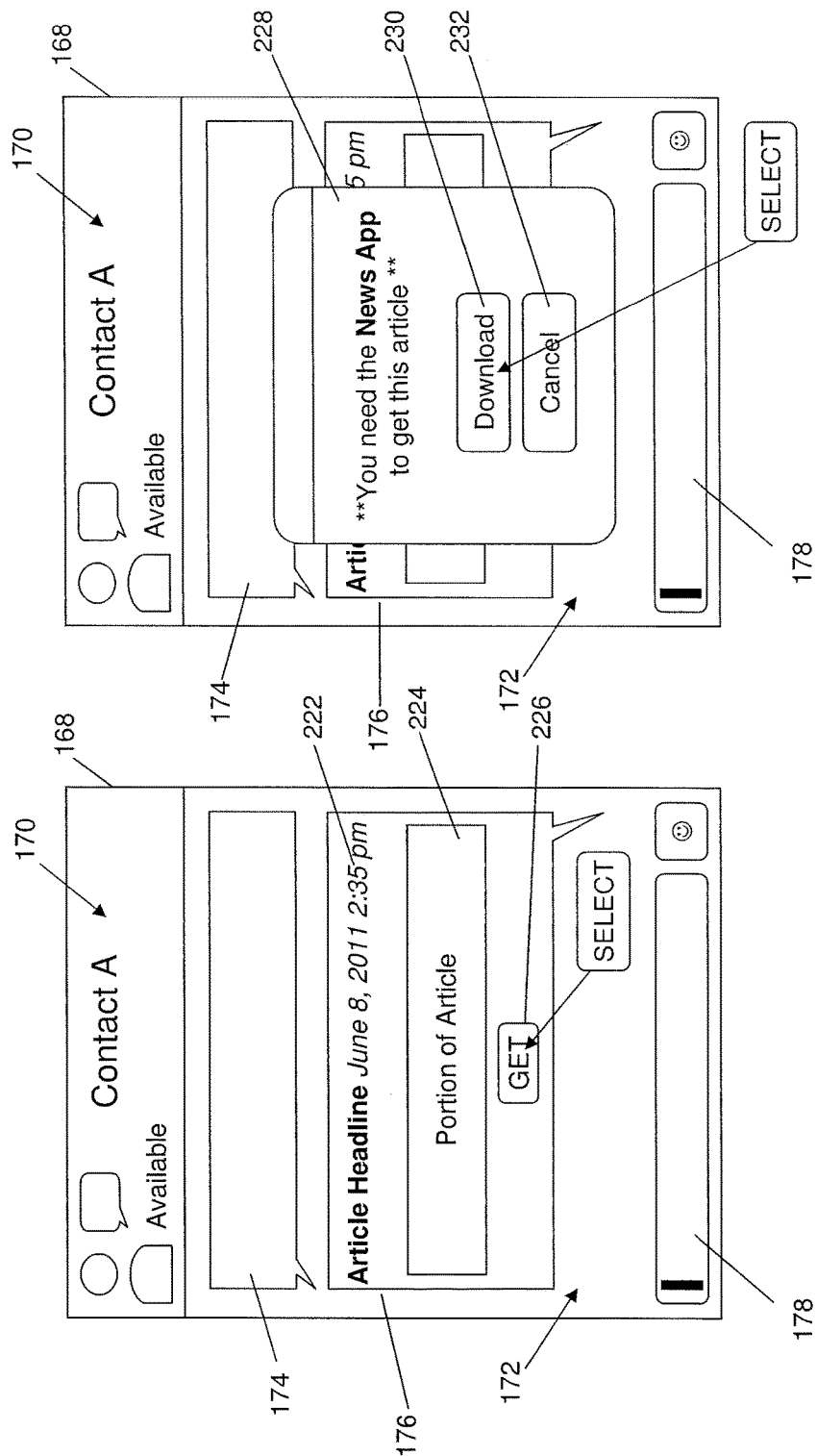

SYSTEM AND METHOD FOR SHARING ELECTRONIC NEWS ITEMS

This application claims priority from U.S. Provisional Patent Application No. 61/568,879 filed on Dec. 9, 2011, the entire contents of which are incorporated herein by reference.

TECHNICAL FIELD

The following relates generally to systems and methods for sharing electronic news items.

BACKGROUND

Portable electronic communication devices such as cellular telephones, personal digital assistants (PDAs), smart phones, tablet computers, laptops, portable gaming devices, etc., are commonly used for exchanging data with other electronic devices. In addition to exchanging messages for conversing among users of portable electronic communication devices, data items such as website content, media files, news articles, etc., may be shared, e.g. by using a tailored messaging medium or application to exchange such data items.

The exchange of messages and the sharing of data often each require tailored applications with associated user interfaces. Where the portable electronic communication device being used has a limited display screen, navigating between applications can be undesirable, in particular where multiple applications are used often and at the same time.

BRIEF DESCRIPTION OF THE DRAWINGS

Embodiments will now be described by way of example only with reference to the appended drawings wherein:

FIG. 8 is a flow chart illustrating an example of a set of computer executable operations that may be performed in inviting at least one contact to view an electronic news article;

FIG. 9 is a flow chart illustrating an example of a set of computer executable operations that may be performed in enabling an invitee to obtain an electronic news article in response to an invitation from an inviter;

FIG. 10 is an example of a user interface (UI) for a news application;

FIG. 11 is an example of a UI for a selected news feed;

FIG. 12 is an example of a UI for a selected electronic news article;

FIG. 13 is an example of a UI for preparing an IM chat invitation;

FIG. 14 is an example of a UI showing a menu comprising an option for sharing an electronic news article via various messaging media;

FIG. 15 is an example of a UI showing an IM chat invitation;

FIG. 16 is an example of a UI for a home screen showing a new item indicator in association with an IM application icon;

FIG. 17 is an example of a UI for a home screen showing a new item indicator in association with a news application icon;

FIG. 18 is an example of a UI for a home screen showing a new chat-related item indicator in association with a news application icon;

FIG. 19 is an example of a UI for a home screen showing a new item indicator and a new chat-related item indicator in association with a news application icon;

FIG. 20 is an example of a UI for an IM conversation comprising a news article invitation in an incoming IM message;

FIG. 21 is an example of a UI for an electronic news article with an embedded chat portion;

FIG. 22 is an example of a UI for a news application screen showing news articles including chats;

FIG. 23 is an example of a UI for a selected news feed wherein an article listed in the UI includes a chat indicator;

FIG. 24 is an example of a UI for an IM conversation comprising a portion of a news article and an option to obtain the full article;

FIG. 25 is an example of a UI for a download prompt displayed when an invitee does not have a news application;

DETAILED DESCRIPTION OF THE DRAWINGS

Figure 1:
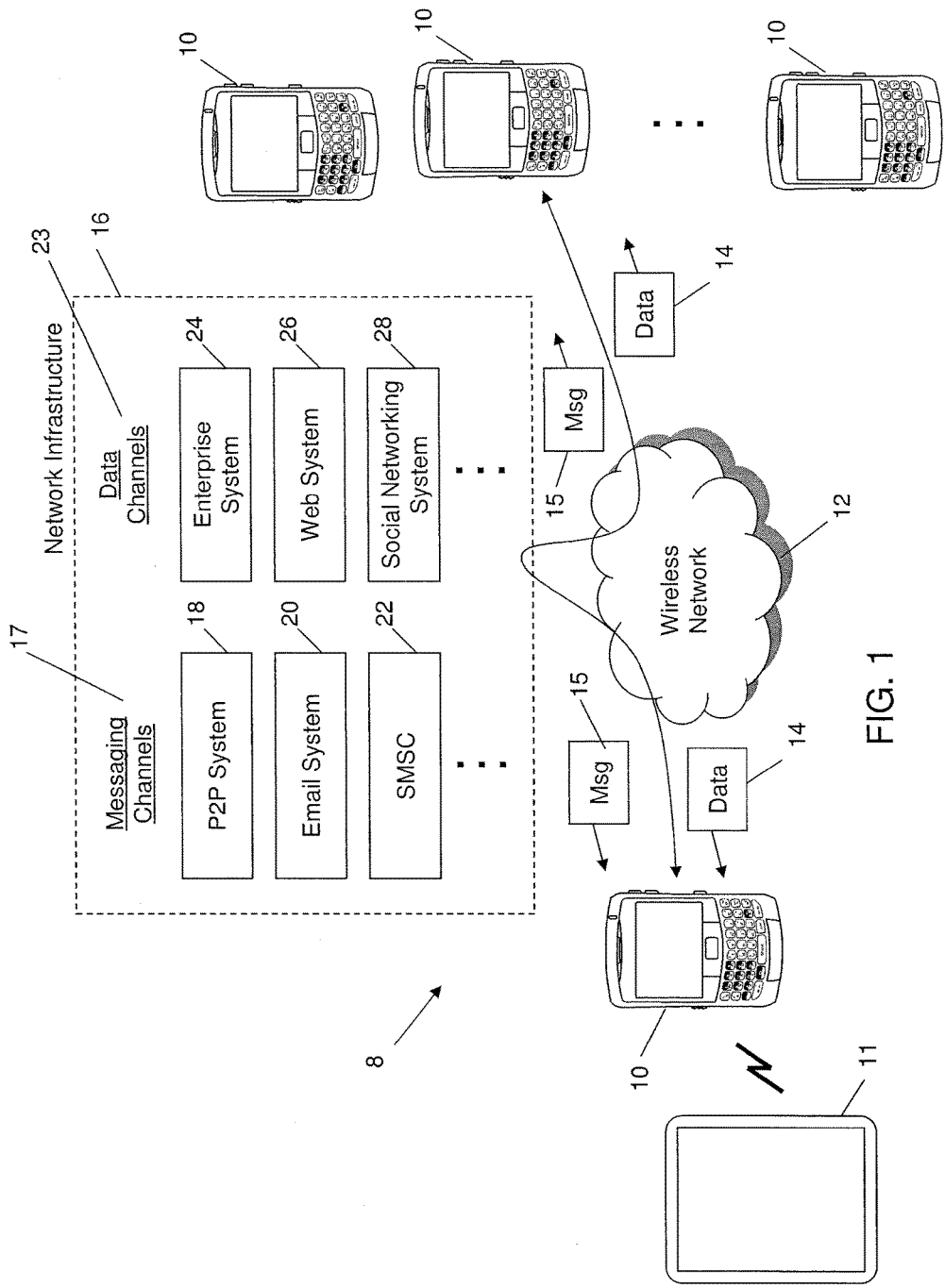
FIG. 1 is a block diagram of an example of a wireless communication system comprising messaging channels and data channels.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practised without these specific details. In other instances, well-known methods, procedures and components have not been described in detail so as not to obscure the examples described herein. Also, the description is not to be considered as limiting the scope of the examples described herein.

Although the principles discussed below are applicable to any electronic communication device, examples will be provided for a mobile communication device, which is one of many types of portable electronic communication devices.

For clarity in the discussion below, mobile communication devices may be commonly referred to as "mobile devices" for brevity. Examples of applicable mobile devices may include, without limitation, cellular phones, smart-phones, wireless organizers, pagers, personal digital assistants, computers, laptops, handheld or other wireless communication devices, wirelessly enabled notebook computers, portable gaming devices, tablet computers, or any other portable electronic device with processing and communication capabilities.

In order to promote conversations between users of electronic devices, the following enables electronic news items (e.g., articles) to be shared using a peer-to-peer (P2P) medium (e.g., IM), and enables chats to be facilitated from within a news application, based on a shared article. By allowing articles to be shared via the P2P medium, and chats to occur within the news application (and in association with a shared news item), a bi-directional platform is provided for disseminating news content and allowing users to seamlessly share the content and ideas or opinions related to the content. Moreover, the P2P medium enables a plurality of users to participate in a chat concerning a particular news item, providing the ability to collaborate and share information more widely within a network of contacts. For example, sharing a particular electronic news article and chatting about same can enhance the conversation from within a single application. It can be appreciated that, although the following examples illustrate sharing an electronic news item and chatting about the news item via a P2P medium, any of the communications described herein may be performed using a different medium, such as email, short message service (SMS), etc. For the purpose of illustration, the following examples will refer to news articles, however, it will be appreciated that the principles discussed herein may apply to any news item, e.g., headline, press clipping, news-related video or audio, etc.

FIG. 1 illustrates an example of a communication system 8 in which various mobile devices 10 may communicate with each other via a wireless network 12. Also shown in FIG. 1 is a tablet computer 11 which, in the example shown, is communicable with or "tethered" to a mobile device 10. It can be appreciated that the tablet computer 11 may also be capable of accessing the wireless network 12 without such tethering. In the example shown in FIG. 1, a mobile device 10 may send or receive data 14 via an associated data channel 23, and may send or receive messages (msg) 15 via an associated messaging channel 17. It can be appreciated that a messaging channel 17 may also be operable to send and receive data 14, and a data channel 23 may also be operable to send and receive messages. As such, the channel designations shown in FIG. 1 are for illustrative purposes only. A network infrastructure 16 that is part of or otherwise communicable with the wireless network 12 provides, hosts, or otherwise facilitates various messaging channels 17 and data channels 23. In the example shown in FIG. 1, the messaging channels 17 are provided by a P2P system 18, an email system 20, and an SMS center (SMSC) 22; and the data channels 23 are provided by an enterprise system 24, a web system (e.g. website server) 26, and a social networking system 28.

A communication system 8 such as that shown in FIG. 1 can be used to enable the sharing of data 14 and to enable chatting about data 14. The sharing and chatting are enabled in part through sending an invitation or a portion of the data 14, using a message 15 sent over a messaging channel 17. For example, in one embodiment and as will be exemplified below, any one of an invitation to view and/or chat about an electronic news article data 14, a portion of the electronic news article data 14, or the entire news article data 14, may be sent from one mobile device 10 to another mobile device 10 using one or more message 15 (see also FIG. 2) via the P2P system 18.

Figure 2:
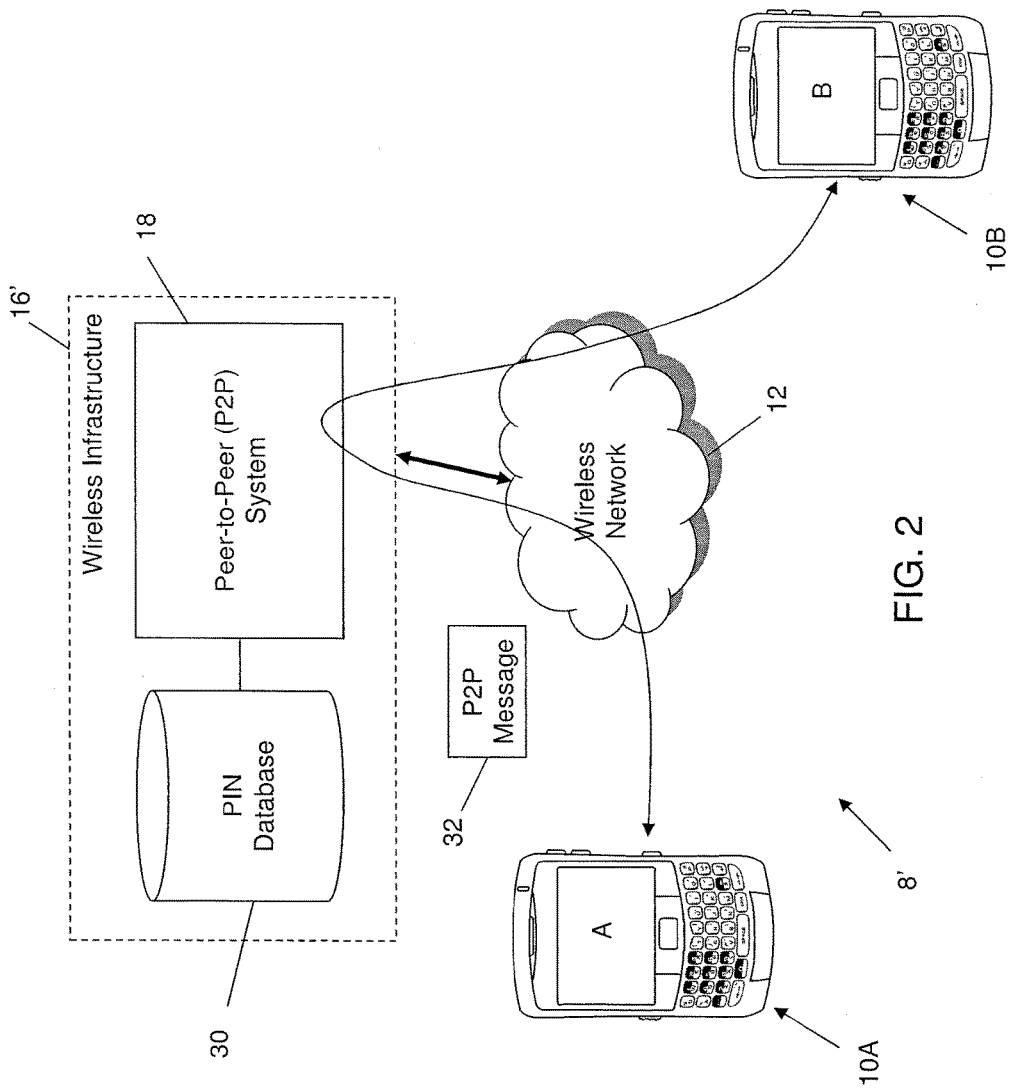
FIG. 2 is a block diagram of an example of a wireless communication system comprising a peer-to-peer (P2P) system.

Turning to FIG. 2, another example of a communication system 8' is shown. The communication system 8', at least in part, enables mobile devices, commonly referred to by numeral 10 (or using numeral 10 as a prefix—e.g. mobile device A, also denoted by 10A and mobile device B, also denoted by 10B), to communicate via a P2P system 18 via a wireless network 12. It will be appreciated that two mobile devices 10A, 10B shown in FIG. 2 are for illustrative purposes only and many other mobile devices 10 (not shown) may also be capable of communicating with or within the communication system 8'. It will also be appreciated that although the examples shown herein are directed to mobile communication devices, the same principles may apply to other devices capable of communicating with the P2P system 18. For example, an application (not shown) hosted by a desktop computer or other "non-portable" or "non-mobile" device may also be capable of communicating with other devices (e.g. including mobile devices 10) using the P2P system 18.

The P2P system 18 is a component of a wireless infrastructure 16' associated with the wireless network 12. The wireless infrastructure 16' comprises, in addition to the P2P system 18, and among other things not shown for simplicity, a personal identification number (PIN) database 30. The PIN database 30 is used to store one or more PINs associated with particular mobile devices 10, whether they are subscribers to a service provided by the wireless infrastructure 16' or otherwise.

The mobile device 10A may communicate with the mobile device 10B and vice versa via the P2P system 18, in order to perform P2P messaging or to otherwise exchange P2P-based communications, as will be explained in greater detail below. For ease of explanation, in the following examples, any P2P-based communication may also be referred to as a P2P message 32 as shown in FIG. 2.

Figure 3:
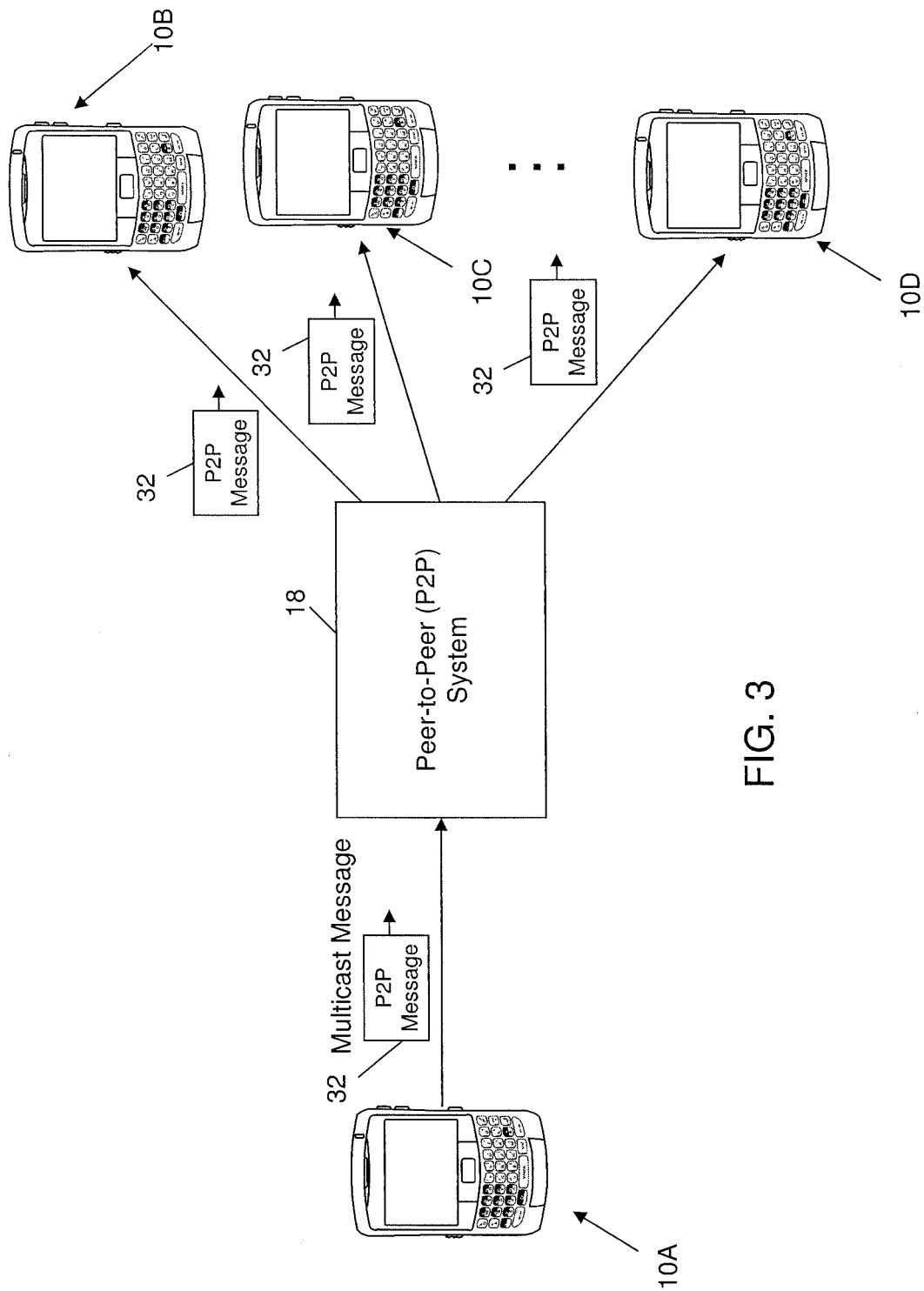
FIG. 3 is a block diagram of an example of a communication of a multi-cast P2P message via the P2P system of FIG. 2.

In some examples, the P2P system 18 is capable of sending multi-cast messages, i.e. forwarding a single message from a sender to multiple recipients without requiring multiple P2P messages 32 to be generated by such sender. For example, as shown in FIG. 3, the P2P system 18 is operable to enable a single P2P message 32 to be sent to multiple recipients by addressing the P2P message 32 to multiple corresponding P2P addresses, and having the P2P system 18 multicast the message 32 to those recipients. In the example shown in FIG. 3 a multicast approach enables the sender (mobile device 10A) to create or forward one message 32 in order to send the same data to multiple recipients (mobile devices 10B, 10C, and 10D for example).

Figure 4:
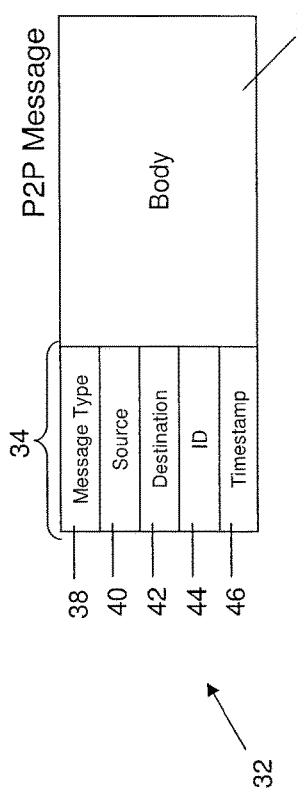
FIG. 4 is a block diagram illustrating an example of a P2P message.

An example P2P message 32 is shown in greater detail in FIG. 4, and has a format that is particularly suitable for a PIN-to-PIN based P2P messaging system. In a typical P2P protocol 50 (see FIG. 5), each P2P message 32 has associated therewith a source corresponding to the mobile device 10 which has sent the P2P message 32 and includes a destination identifying the one or more intended recipients. Each P2P message 32 in this example comprises a body 36, which contains the content for the P2P message 32 (e.g. text or other data), and a header 34, which contains various fields used for transmitting and processing each P2P message 32. In this example, the header 34 includes a message type field 38 to specify the type of transmission (e.g. chat, registration, block, presence, news, share, invite etc.), a source field 40 to specify the device address or PIN for the sender, a destination field 42 to specify the device address(es) or PIN(s) for the one or more intended recipients, an ID field 44 to identify the corresponding P2P application and a timestamp field 46 to indicate the time (and if desired, the date) at which the P2P message 32 was sent by the designated sender.

It can be appreciated that the ID field 44 can be used to specify the application ID to identify a P2P application on the mobile device 10. Where the P2P application relates to, for example, an instant messaging (IM) system, the message type field 38 can also be used to designate an IM communication, and the ID field 44 would then correspond to a conversation ID, i.e. a conversation thread the P2P message 32 corresponds to (e.g. such that each P2P message 32 is identified by the conversation in which the P2P message 32 was sent).

It will be appreciated that other information or attributes may be included in the P2P message 32, such as a subject field (not shown) to enable a subject for part or all of a conversation (such as, for example, in an IM implementation) to be transported with the P2P message 32 (e.g., to create new subjects, modify subjects, notify others of subjects, etc.), or application details field (not shown) to provide application-specific information such as the version and capabilities of the application.

Figure 5:
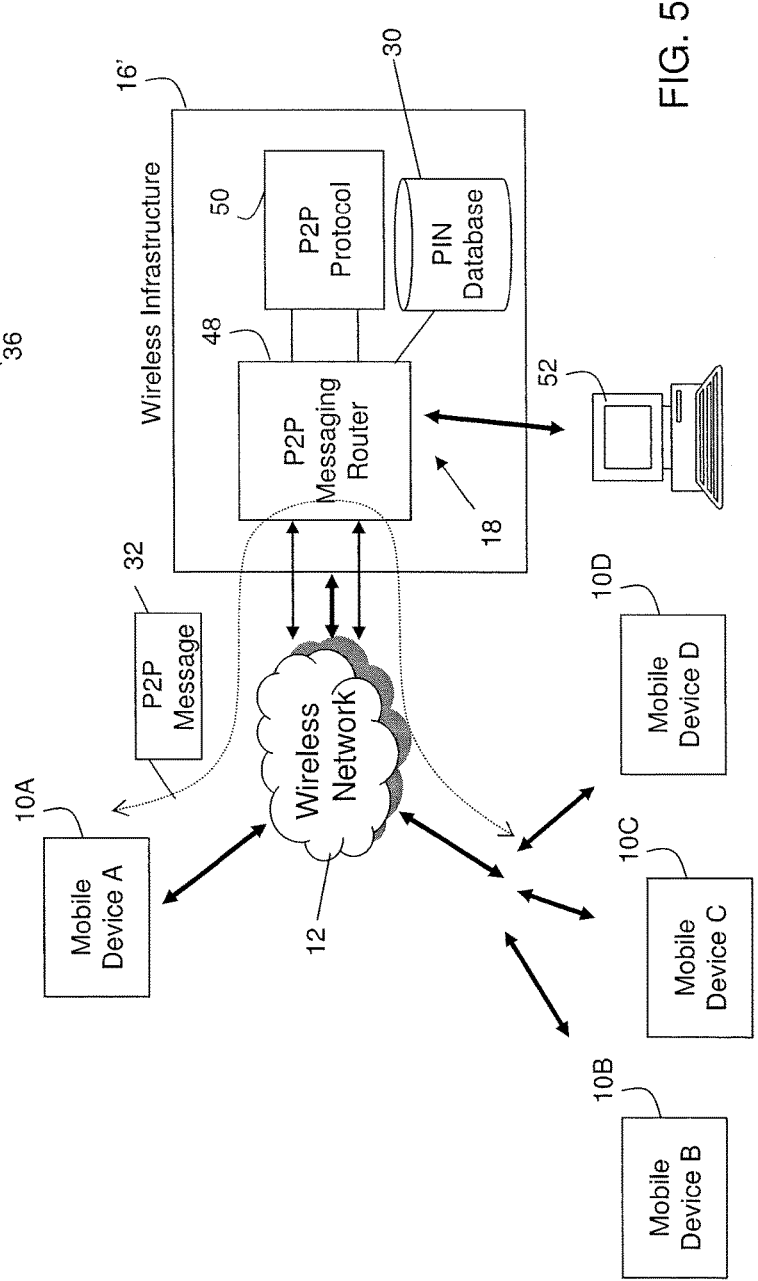
FIG. 5 is a block diagram illustrating an example of a configuration for the wireless infrastructure and P2P system shown in FIG. 2.

Turning now to FIG. 5, an exemplary configuration is shown that is suitable for a user of mobile device A, hereafter referred to as mobile device 10A, to conduct a P2P communication (e.g., instant messaging) with buddies included in a contact list (not shown). In FIG. 5, the P2P system 18 is incorporated into the wireless infrastructure 16' of the wireless network 12. The P2P system 18 can utilize any suitable P2P protocol 50 operated by a P2P messaging router 48, shown in this example as part of the wireless infrastructure 16'. It can be appreciated however, by those skilled in the art, that a stand-alone P2P configuration (i.e. that does not rely on the wireless infrastructure 16'—not shown) may equally apply the principles disclosed herein. The example configuration shown in FIG. 5 is particularly suitable for implementing a PIN-based messaging system. As can be seen, the P2P messaging router 48 may also enable mobile devices 10 to communicate with desktop computers 52 thus facilitating, for example, communications such as instant messaging (IM) between mobile applications and desktop applications on the desktop computer 52.

Particularly suitable for hosting the P2P messaging router 48, is a wireless router or server used in systems such as those that provide push-based communication services. In FIG. 5, the wireless infrastructure 16' facilitates P2P communications such as instant messaging between mobile device 10A and mobile devices for User B, User C and User D, denoted by 10B, 10C and 10D respectively using the P2P messaging router 48. It will be appreciated that the number of users participating in the example shown in FIG. 5 is for illustrative purposes only. P2P messaging, such as IM, is provided by an associated application stored on each mobile device 10A-10D which can be initiated by a user by, for example, highlighting and selecting an icon displayed on a display of a mobile device 10 as is well known by those skilled in the art. The P2P messaging router 48 routes messages between the mobile devices 10A-10D according to the P2P protocol 50. For example, the P2P protocol 50 may define a particular way in which to conduct IM or other types of messaging.

In general, in a P2P protocol 50, the sender of the P2P message 32 knows the source address of the intended recipient, e.g. a PIN. This may be established when the two devices request to add each other to their respective contact or buddy lists. It can be seen in the example shown in FIG. 5 that mobile device 10A can communicate directly with any of the mobile devices 10B-10D through the P2P messaging router 48 as indicated by the short-dashed line without requiring a dedicated server for facilitating communications. In other words, the P2P messaging router 48 enables the mobile devices 10 to communicate with each other directly over the wireless infrastructure 16' in accordance with the P2P protocol 50.

When conducting a P2P session according to the example shown in FIG. 5, the mobile devices 10A-10D can communicate directly with the wireless infrastructure 16' in a client based exchange where, as noted above, an intermediate server is not required. A P2P message 32 sent by one mobile device 10 is received by the wireless infrastructure 16', which obtains the source address for the intended recipient (or recipients) from information associated with the message 32 (e.g., a data log) or from the message 32 itself. Upon obtaining the recipient's address according to the P2P protocol 50, the wireless infrastructure 16' routes the message 32 to the recipient associated with the mobile device 10 having such address (or recipients having respective addresses). The wireless infrastructure 16' typically also provides a delivery confirmation to the original sender, which may or may not be displayed to the user. The destination device can also provide such delivery information. The wireless infrastructure 16' should be capable of routing P2P messages 32 reliably and hold onto (i.e. store, at least temporarily) the P2P messages 32 until they are successfully delivered. Alternatively or additionally, if delivery cannot be made after a certain timeout period, the wireless infrastructure 16' provides a response indicating a failed delivery. In one embodiment, the wireless infrastructure 16' chooses to expire a message 32 if a certain waiting period lapses.

In order to promote conversations between users of electronic devices, mobile devices 10 may be configured to enable electronic news articles to be shared using a P2P medium (e.g., IM), and to enable chats to be facilitated from within a news application, based on a shared article. By allowing articles to be shared via the P2P medium, and chats to occur within the news application, and in association with a shared article, a bi-directional platform is provided for disseminating news content and allowing users to seamlessly share the content and ideas or opinions related to the content. Moreover, the P2P medium enables a plurality of users to participate in a chat concerning a particular news article, providing the ability to collaborate and share information more widely within a network of contacts. For example, sharing a particular electronic news article and chatting about same can enhance the conversation from within a single application.

Figure 6:
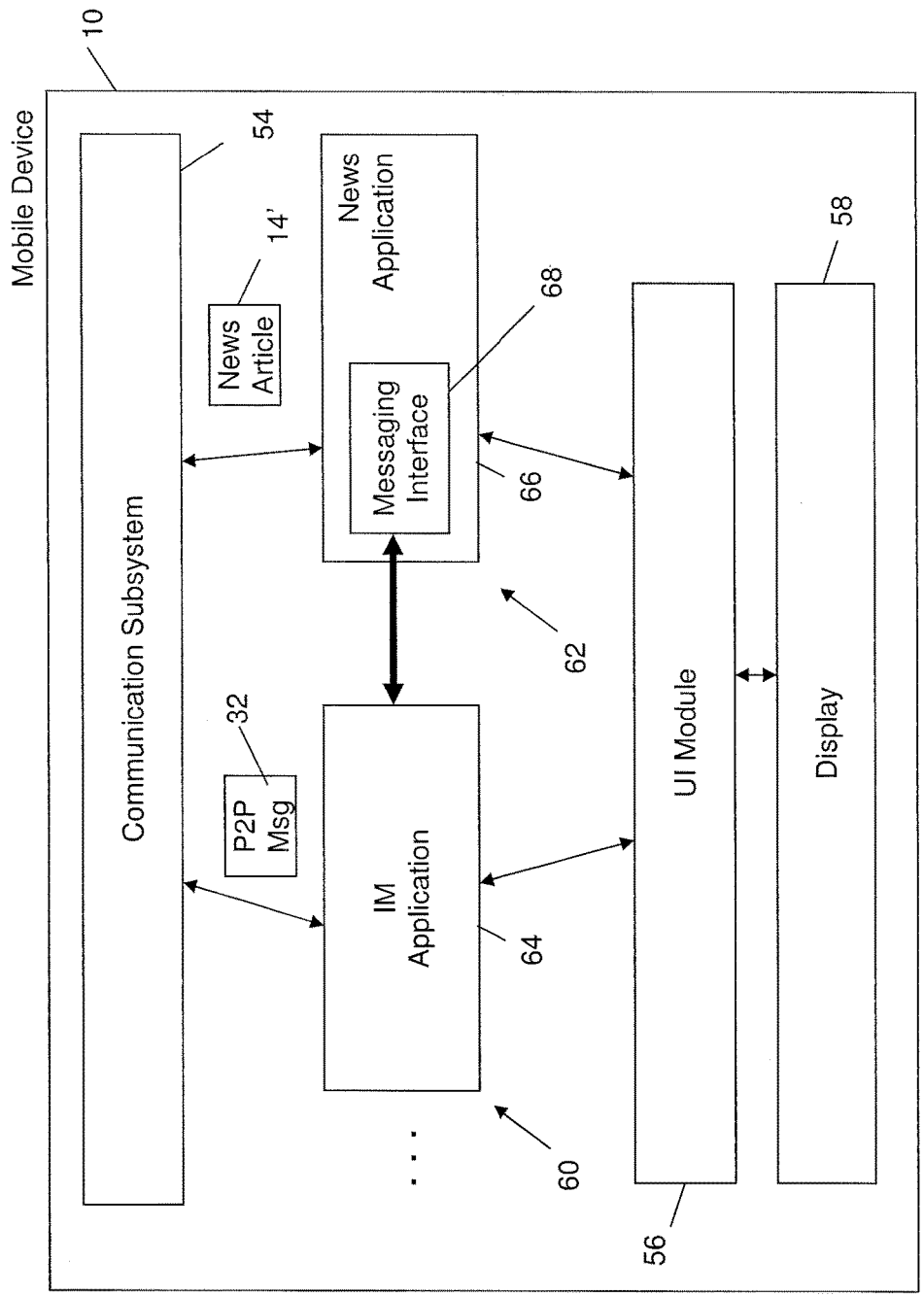
FIG. 6 is a block diagram illustrating an example of a configuration for a mobile device.

FIG. 6 illustrates an example of a configuration for a mobile device 10. In the example shown in FIG. 6, the mobile device 10 is operable to send and receive data and messages using a communication subsystem 54. Messages are sent and received using a corresponding messaging-channel application 60, and data are sent and received using a corresponding data-channel application 62. In this example, an IM application 64 is shown to illustrate a particular messaging-channel application 60 and a news application 66 is shown to illustrate a particular data-channel application 62. It can be appreciated that although the examples below utilize the IM application 64 and the news application 66, the principles equally apply to other messaging-channel applications 60, data-channel applications 62, and interactions therebetween. For example, other messaging-channel applications 60 may include SMS and email applications (not shown); and other data-channel applications 62 may include movie, song, book, and other digital media applications.

The IM application 64 sends and receives P2P messages 32, and the news application 66 obtains news articles 14' (e.g., receives, downloads, etc.). As will be discussed below, the news application 66 may also be operable to send news articles 14' or portions thereof, for example, in sharing at least a portion of a news article 14' with another entity using a messaging interface 68 with the IM application 64. It can be appreciated that, as discussed further below, content of a news article 14' may also be sent in one or more P2P messages 32 in order to enable one mobile device 10 to provide the news article 14' to another mobile device 10 using the IM application 64. The mobile device 10 also includes a UI module 56 for rendering UI elements and "screens" showing such elements, for various applications, on a display 58. The messaging interface 68 is operable to enable the news application 66 to access or utilize features of a messaging-channel application 60. For example, the IM application 64 may provide an application programming interface (API) that exposes functionality to the news application 66 to enable an IM chat to be embedded or otherwise displayed with a particular news article 14'.

Figure 7:
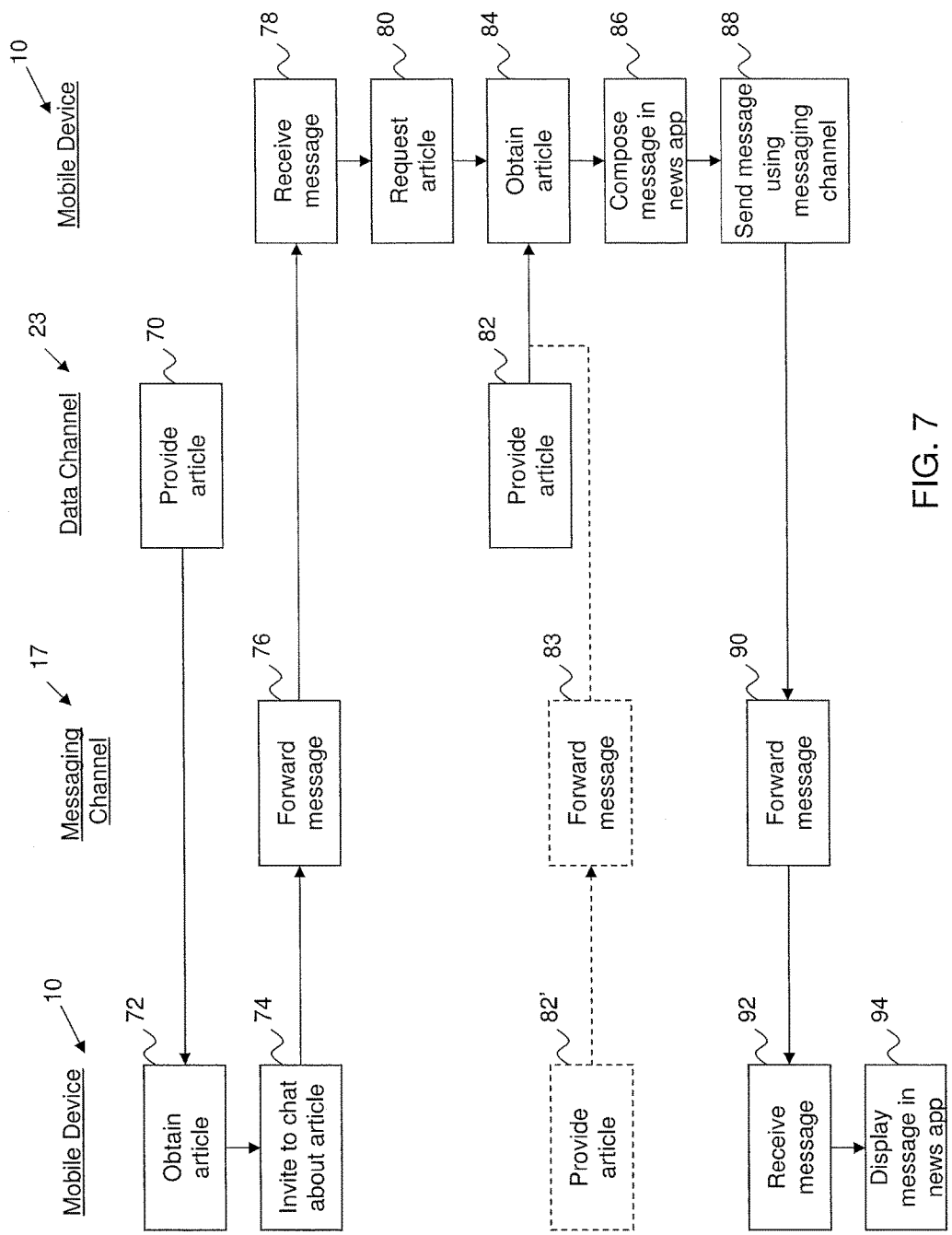
FIG. 7 is a flow chart illustrating an example of a set of computer executable operations that may be performed in initiating a chat concerning an electronic news article.

FIG. 7 illustrates an example of computer executable operations that may be performed by a mobile device 10 in initiating a chat concerning an electronic news article. It can be appreciated that although FIG. 7 illustrates an example including a pair of mobile devices 10, the principles discussed below equally apply to scenarios wherein one or more other types of devices participate in the exchange of messages and news articles or portions thereof. At 70, a data channel 23 provided by a web system (e.g. a web-based server providing a Really Simple Syndication (RSS) feed) provides a particular news article. For example, the web system posts or otherwise makes the news article available or sends a feed containing the news article to subscribers of a news feed. At 72, a first mobile device 10 enables the news article provided by the web system to be obtained. For example, the first mobile device 10 may enable the news article to be downloaded using a news application or enable a news feed to be subscribed to thus enabling news articles to be transmitted to the first mobile device 10 on a periodic basis. At 74, the first mobile device 10 enables an invitation to be sent to a second mobile device 10 associated with a contact of a user of the first mobile device 10 (Contact A in the examples herein) to chat about the article obtained at 72. The invitation sent at 74 is sent using a messaging channel 17 that is associated with a messaging-channel application on the first mobile device 10, from which the invitation is initiated. In this example, an invitation is sent using an IM application, wherein a P2P system provides the messaging channel 17. The system or infrastructure used by the messaging channel 17 forwards or otherwise facilitates the delivery of a message containing the invitation at 76, the invitation message being received by the second mobile device 10 at 78. For example, a P2P message may be used to send an invitation to Contact A using the second mobile device 10. It can be appreciated that the invitation message may also include at least a portion of the news article in order to provide a preview or other enticement to encourage Contact A to obtain and view the same news article.

At 80, the second mobile device 10 requests the news article associated with the invitation received at 78. As noted above, a portion of the news article may be included in the invitation message or a link to enable the second mobile device 10 to download the news article or subscribe to a news feed that distributes the news article. At 82 the news article is provided by the associated data channel 23 and is obtained by the second mobile device 10 at 84 through a communicable connection between the second mobile device 10 and a system (e.g. web server) providing the data channel 23. For example, the invitation message received by the second mobile device 10 at 78 is used to initiate downloading of the news article from a web server used using the data channel 23. It can be appreciated that the news article may be obtained by the first and second mobile devices 10 from the same source or from different sources. For example, the news article contents may be distributed by a news association but made available through multiple news sources.

As also shown in FIG. 7, at 82' the first mobile device 10 that sent the invitation message at 74 may also send the news article or any remaining portions thereof that were not included in the invitation by sending one or more additional messages to the second mobile device 10. At 83 the news article or any remaining portions thereof are forwarded from the first mobile device 10 to the second mobile device 10 using the messaging channel 17. In this way, Contact A can receive the news article on the second mobile device 10 using the same messaging channel 17 that is used for messaging between the first mobile device 10 and the second mobile device 10. At 84 the new article is obtained by the second mobile device 10.

After the news article is obtained at the second mobile device 10, a conversation about the news article can begin at 86 of FIG. 7, where Contact A composes a new message using a news application on the second mobile device 10. For example, if a relationship exists between the second mobile device 10 and another mobile device of a second user (not shown), the news application 66 of the second mobile device 10 provides the ability to compose a new chat message within, or in association with, the news article. At 88, once the new chat message has been composed, a messaging interface operates to send the new chat message to the mobile device of the second user using the associated messaging channel 17, e.g., using a P2P system and an IM application. At 90 the messaging channel 17 facilitates the forwarding of the new chat message to the mobile device of the second user. At 92 the mobile device of the second user receives the new chat message and displays a representation or indication of the new chat message in association with its news application 66 in, for example, an embedded chat for the shared news article.

It can be appreciated that the invitation message sent at 74 can be composed in various ways and can provide various information. For example, if the associated messaging channel 17 permits enough bandwidth, a portion of the news article and a headline can be provided as part of the invitation message with a link or option to have the recipient or "invitee" obtain the full article either by obtaining further content via the same messaging channel 17, or by accessing a third party server or data channel 23.

In another example, as shown in FIG. 8, an invitation message can be composed and sent as a new message instead of transporting a portion of the news article itself, or preceding such transport. Turning now to FIG. 8, a contact selector may be provided by the messaging interface, at 98, which enables the selection of one or more contacts. It can be appreciated that the invitation may also be prepared for, and sent to, a user that is not currently a contact, e.g. using an email address, phone number, PIN, or other identifier known to the user. Such an invitation may be used when the messaging channel 17 being used does not rely on contacts or buddies (e.g. email) for regular communications. The following examples will, however, assume that the invitee is a contact that is known to the user of the mobile device 10, i.e. another user of at least a particular messaging channel\that is within the user's address book or social network or is otherwise known or familiar to the user. An invitation sent to a contact enables the messaging interface to utilize other features provided by the messaging-based application, e.g. IM presence, contact profiles, etc.

As can be seen in FIG. 8, the contact selector provided at 98 may be optionally populated with only contacts that have a news application by determining at 96 which of the contacts has the news application. Such information may be provided by a server or other network component associated with a messaging channel. For example, an IM presence server (not shown) may append information to a presence update or other data packet that indicates whether or not particular contacts have the news application. Determining which contacts have the news application provides a filtering of the contacts to identify to the user which of their contacts are currently using the news application. Such filtering enables a user to conveniently chat with other news application users without causing the recipient user to have to obtain the news application if it does not yet have the news application.

At 100 the messaging interface may then determine whether or not at least one contact selection has been verified, e.g. by detecting selection of an input verifying the selections. If the contact selections have not been verified, the messaging interface ends the invitation process at 102. If the contact selections are verified at 100, the invitation and any associated message are sent to the one or more selected contacts at 104. It can be appreciated that the additional verification at 100, shown in FIG. 8, is optional.

In examples wherein an invitation can be sent to any contact (or users which are not currently contacts), the recipient or invitee may not currently have the news application installed on their mobile device. FIG. 9 illustrates an example of a set of computer executable operations that may be performed by a second mobile device 10 at 84 (of FIG. 7) after detecting an input requesting the article at 80 (of FIG. 7). At 106, the messaging-channel application determines whether or not the second mobile device 10 has the news application 66. If the second mobile device 10 does have the news application 66, the news application 66 is initiated at 108 to obtain the news article 14' associated with the invitation. If the second mobile device 10 does not have the news application 66, the messaging-channel application 60 or an operating system (OS) for the second mobile device 10, or another application, enables the news application to be downloaded at 110. For example, a uniform resource locator (URL) or other link may be provided in a message 15 that directs a mobile device browser to a web site or service (e.g. an application store) providing a downloadable file. At 112, the second mobile device 10 determines whether or not the news application 66 has been installed. If not, e.g., if the user cancels the download, the process ends at 114. If the news application 66 has been installed, the news application 66 may be initiated to obtain the news article at 108.

FIG. 10 illustrates an example of a news application UI 116 that is displayed as part of a news application such as, for example, news application 66 of FIG. 6. The news application UI 116 includes an unread items portion 117, which is selected to view news articles that have been received by the news application but not yet viewed or read; and an IM chats portion 118, which is selected to view news articles that have chats associated therewith. An add feed option 119 is also provided in the news application UI 116, which enables a news feed to be subscribed to for receiving news articles associated with the added news feed. The news application UI 116 also includes a list of news feeds 120. In this example, the list of news feeds 120 includes News Feed A, News Feed B, and News Feed C. As shown in FIG. 10, on detecting selection of News Feed A, a news feed UI 121 for News Feed A is displayed, as shown in FIG. 11. The news feed UI 121 includes a list of news articles 122. On detecting selection of Article 3 in the list of news articles 122 as shown in FIG. 11, a news article UI 124 may be displayed as shown in FIG. 12.

The news article UI 124 of FIG. 12 includes an article headline portion 125, which may include date and time information related to the article, in addition to the headline; and includes an article content portion 126, which displays at least a portion of the news article. As can be seen in FIG. 12, a full article button 127 is provided, which when selected, causes the news application to obtain any portion of the news article that has not yet been obtained, and in some embodiments displaying the obtained portion. A forward as button 128 is provided to enable an indication of the news article, such as a link, to be forwarded to a recipient, such as another mobile device, e.g. via IM, SMS, email, Twitter feed, etc. A new chat button 129 is also provided in the news article UI 124, which enables a chat concerning the news article to be initiated and associated with the news article UI 124. It can be appreciated that by providing the new chat button 129, the user can choose to go beyond merely sharing an article, and can proceed to share thoughts, opinions, and ideas regarding the article. As discussed above, a messaging interface enables the news application to utilize an existing messaging-based protocol, UI, and experience to further enhance the news article chat.

In one example shown in FIG. 13, selection of the new chat button 129 of FIG. 12 initiates an invitation process by displaying a news chat invitation UI 130. As can be seen in FIG. 13, the news chat invitation UI 130 may include a search bar 131 for searching for potential chat participants, such as within a list of contacts 132. The list of contacts 132 enables selection of one or more contacts with which the user wishes to chat about the news article, in this example, Article 3 from News Feed A. It can be appreciated that, as discussed above, the list of contacts 132 can be filtered such that only contacts having the news application (or an equivalent thereof) are shown. In this example, a show all contacts option 133 is provided, to enable such filtering to be turned off. An OK button 135 is provided and may be selected to initiate sending the invitation, and a Cancel button 136 is provided and may be selected to abort the invitation process.

It can be appreciated that initiating a chat concerning a news article may be performed in other ways. For example, as shown in FIG. 14, a menu 140 including a chat option 142 may be invoked while the news article UI 124 is displayed. In this example the chat option 142 includes various sub-options 144, including options to chat via email, IM, or SMS. It can be appreciated that any messages exchanged via any protocol can be used to populate a chat associated with a news article. For example, portions of email messages (not shown) may be displayed with the news article UI 124 to post comments with respect to the news article. A familiar or otherwise common UI (not shown) may also be displayed regardless of which messaging protocol is used. For example, a messaging interface may be operable to enable a chat to occur between IM contacts and an additional contact via SMS, with all messages being displayed in a consistent fashion (e.g. as shown in FIG. 22 and described below).

Returning to the example of FIG. 13, after detecting selection of the OK button 135, an invite message UI 146 is displayed as shown in FIG. 15. The invite message UI 146 enables a message related to the news article to be entered into a message input box 148. The message may be used to stimulate a conversation about the article or otherwise identify a potential interest in the article. The message may be sent in addition to or instead of a portion of content from the news article. An invite button 150 is provided, which when selected, causes the invitation to be sent to the one or more contacts selected from the news chat invitation UI 130. A cancel button 152 is provided, to enable the invitation process to be aborted before the invitation is sent.

The invitation sent following a selection of invite button 150 is received by a computing device associated with the one or more contacts selected using, for example, list of contacts 132 of FIG. 13. As discussed above, the invitation may be provided to the computing device of the selected contact(s) in various ways.

In the following examples, an invitation to view and chat about Article 3 from News Feed A has been sent pursuant to a detected selection OK button 135 of FIG. 13 from a mobile device to a computing device of Contact A, wherein both the mobile device and the computing device are running a news application.

In a first example, the invitation is sent using a messaging application associated with a messaging channel that is used to conduct chat sessions. For example, as shown in FIG. 16, Contact A may receive the invitation in an IM application, wherein a new IM activity indicator 160 is displayed in association with an IM icon 158 on a home screen 154 or other screen (e.g. using a colored "splat").

In a second example, the invitation is received or otherwise made available through a news application on the computing device and is displayed within a news application UI. For example, as shown in FIG. 17, Contact A may receive the invitation in a news application, wherein a news activity indicator 164 is displayed in association with a news icon 162 on the home screen 154 or other screen (e.g. using a colored "splat"). As shown in FIG. 18, an IM indicator 166 may also be displayed in connection with the news icon 162 to indicate that an IM exists or has been initiated within at least one news article. In yet another example, both a new IM activity indicator 164 and an IM indicator 166 can also be displayed together in connection with the news icon 162.

It can be appreciated that an invitation may be received via a messaging-channel application (e.g., as shown in FIG. 16) to establish the chat relationship using a messaging interface, with subsequent chat messages being routed through and displayed by a news application. This may be advantageous in order to allow users to control which chats they wish to accept via the messaging-channel application to avoid several chats beginning within the news application that are not of interest.

FIG. 20 illustrates an example of an IM UI 168 as seen by Contact A after receiving an invitation through the IM application 64, as described above. In this example, the IM UI 168 includes a header portion 170, which may include contact profile information, presence information, and an avatar for the sender of the invitation; a message history portion 172, which includes outgoing messages 174 and incoming messages 176; and a message entry box 178 for composing new outgoing messages. In the example shown in FIG. 20, the latest incoming message 176 includes an invitation header 180 indicating that the sender identified in the header portion 170 has sent an invitation to launch a news application with respect to an article. A message contents portion 182 is also displayed in the incoming message 176, which corresponds to the message composed by the sender when creating the invitation. An accept button 184 included in the incoming message 176 enables the news application to be launched from the IM UI 168 in order to display the news article associated with the invitation and begin chatting about, or otherwise interacting with, the news article. A decline button 186 is also provided, which can be selected to enable the recipient (i.e., the invitee—Contact A) to not accept the invitation and thus forego or avoid launching the news application. By selecting the accept button 184, a shared news article UI 194 is displayed as shown in FIG. 21.

It can be appreciated that the shared news article UI 194 shown in FIG. 21 is as seen by Contact A and a similar UI (not shown) may be seen by the sender of the invitation. The shared news article UI 194 in this example includes a similar look and feel as the news article UI 124 shown in FIG. 12 in an upper portion 195 thereof, including an article headline portion 196, an article content portion 198, a full article button 200, and a forward as button 202. To enable a chat associated with the news article to be concluded or otherwise cancelled or deleted, an end chat button 204 is also included in the upper portion 195 of the shared news article UI 194. The shared news article UI 194 also embeds a lower messaging portion 206 that includes a similar look and feel as the IM UI shown in FIG. 20. In this example, the lower messaging portion 206 includes a header portion 208, which identifies the one or more contacts participating with Contact A in the chat, and may also identify a subject such as the article being discussed (e.g., Article 3). The messaging portion 206 also includes an outgoing message 212 and an incoming message 214 in a message history portion 210, and a message composition portion 216. A hide bar 218 may also be provided as shown in FIG. 21, to hide or expose the message composition portion 216. By embedding the messaging portion 206 in the shared news article UI 194, a conversation can take place in association with a news article without having to switch between separate applications. Moreover, conversation history between the contacts that relates to the news article can be kept separate from other conversations in the IM application. It is to be understood that FIG. 21 is one example of the specific ordering and existence of elements and that specific elements can be reordered or hidden or removed altogether in other embodiments. For example, in some embodiments header portion 208 does not include a subject.

Once a chat has been initiated for at least one article, the IM chats portion 118, shown in FIG. 10, can be updated to show that a particular numbers of articles include a chat. FIG. 22 illustrates an articles with chats UI 188 that may be displayed after detecting selection of the IM chats portion 118. The articles with chats UI 188 includes a list of articles with chats 190. Each item in the list of articles with chats 190 may include identifying or contextual information 192, such as message contents or conversation participants. For example, the latest message sent in the chat may be displayed as the contextual information 192. In the example shown in FIG. 22, Article 3, for which a chat was initialized in FIGS. 12 to 15, is shown in the list of articles with chats 190, along with another news article, Article N, that in this example, is shared with an Other User. It can be appreciated that the items in the list of articles with chats 190 may be sorted according to conversation activity or other criteria, for example, a send time, a receive time, whether or not there are unread messages, etc.

FIG. 23 illustrates another view of the news feed UI 121 for News Feed A shown in FIG. 11, wherein the item in the list of article 122 that identifies Article 3 includes a chat indication 220. It can be seen in this example, that more than one chat may be associated with the same news article. As such, both group conversations concerning a news article may be supported, as well as separate conversations concerning the same news article. In one example, chat indication 220 provides a summary of the number of chats ongoing with regards to the news article. In another example, chat indication 220 includes a representation of each of the chats ongoing with regards to the news article and provides, for example, a list of the chat participants or a preview of the latest activity in the chat, or both.

As discussed above, where a messaging channel permits or supports enough bandwidth, an invitation can include additional information, such as the article headline and at least a portion of the article, to provide further context with respect to the invitation. FIG. 24 illustrates an example in which an incoming IM message 176 includes the article headline 222, a portion of the article 224, and a get button 226. It can be appreciated that, as shown in FIG. 24, a cancel button may be excluded, wherein not selecting the get button 226 implicitly ignores the invitation. By providing a portion of the article 224 rather than a custom message, the number of steps in the invitation process may be reduced. However, it can be appreciated that a custom message may also be included with the portion of the article 224 and the article headline 222 to provide even further context with respect to the invitation. For example, the user may add a message that reads: "Remember we were discussing this last night?", which may increase the likelihood that the recipient will be interested in the article being sent. Providing a portion of the article 224 can also allow the recipient to preview the news article before deciding to download and install a news application.

As also discussed above, if the recipient of an invitation to view a news article does not currently have a news application, the recipient may be assisted in downloading the news application. For example, as shown in FIG. 25, after the get button 226 has been selected (as shown in FIG. 24), or after any other suitable input or trigger, such as receipt of the invitation (not shown), a download UI 228 is displayed that provides a message indicating that the recipient needs the news application in order to view the article. A download button 230 may be provided to enable a download process, and a cancel button 232 may be provided to enable the download process to be avoided. By providing the download UI 228, sharing news articles through a messaging channel can contribute to the increased adoption of the news application. Moreover, a download process associated with the download UI 228 can provide a seamless entrée into the news application by having a shared article UI 194 (of FIG. 21) displayed upon the download completing.

Figures 26, 27:
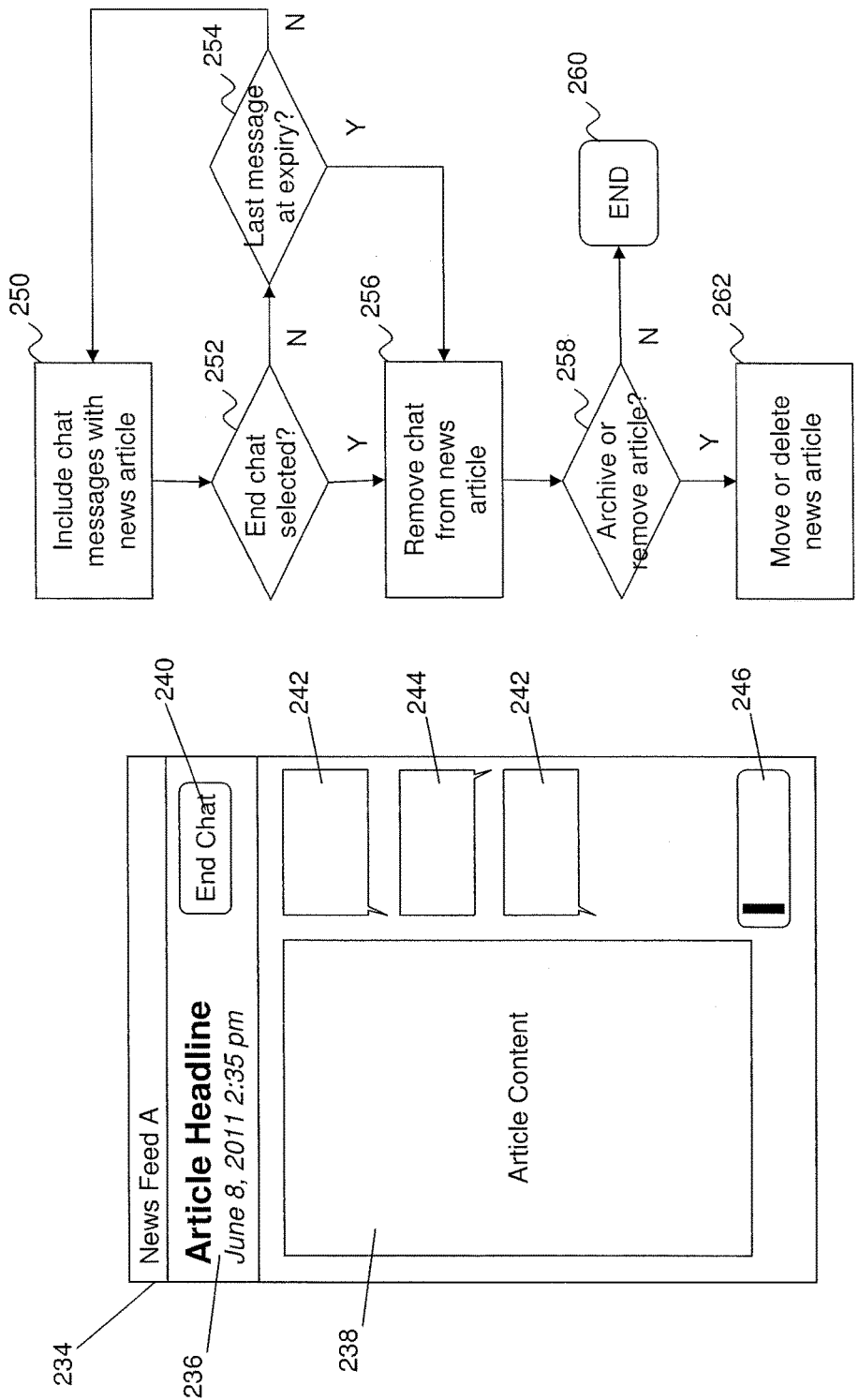
FIG. 26 is an example of a UI for an electronic news article with an embedded chat portion.
FIG. 27 is a flow chart illustrating an example of a set of computer executable operations that may be performed in ending a chat in an electronic news article.

It can be appreciated that a chat can be embedded into a news article in various ways. For example, as shown in FIG. 26, a shared news article 234 having a headline portion 236 and an article content portion 238, can be arranged to include outgoing messages 242, incoming messages 244, and message composition entry box 246 along one side of the article content portion 238 to facilitate scrolling through the news article. An end chat button 240 may also be provided in any suitable location, such as part of the article headline portion 236 as shown in FIG. 26. It can also be appreciated that multiple orientations can be selectable within the news article UI 234. For example, the arrangement shown in FIG. 26 can be changed to the arrangement shown in FIG. 21 and vice versa, e.g., by detecting selection of a menu option, detecting selection of an external key or other input, etc.

In addition to enabling a chat to be ended or removed, e.g., using the end chat button 204 (of FIG. 21) or end chat button 240 (of FIG. 26), various other chat management criteria may also be employed. FIG. 27 illustrates an example of a set of computer executable operations that may be performed in managing chat expiration. At 250, a messaging interface enables chat messages to be included with a news article, and determines at 252, if end chat button 204, 240 has been selected. If the end chat button 204, 240 has not been selected, the messaging interface may then determine at 254 if the last message sent has reached an expiry time. For example, a chat may be automatically removed from a news article if the last message sent is particularly old, such as 1 month. Such an automatic removal can be employed to provide chat expiry management without necessarily relying on the user to remember to end the chat. By removing a chat, the IM chats portion 118 (of FIG. 10) can be de-cluttered to make more current articles with more current chats more easily accessible.

If the last (i.e. most recent) message in the chat for a news article has reached the expiry time, or the end chat button 204, 240 has been selected, the chat is removed from the news article at 256. Removing the chat may then cause the article to be removed from UI screens that sort or filter news articles based on whether or not a chat is associated therewith, e.g., as shown in FIGS. 10, 22, and 23.

In addition to removing a chat status from a news article, the news articles stored or otherwise held by a news application can also be removed or archived according to one or more criteria. At 258, the news application determines whether or not the news article for which the chat has been removed should be archived or removed, e.g. if it has reached an article storage expiry. If not, the article management process ends at 260. If the news article should be archived or removed, the news application moves the news article (e.g., to an archive), or deletes the news article at 262.

Accordingly, there is provided a method comprising: sending a first message to a recipient using a messaging channel, the message including information identifying an electronic news item provided by a data channel; receiving a second message from the recipient over the messaging channel, the second message having been composed in a news application; and displaying the second message in association with the electronic news item in the news application.

There is also provided a method comprising: receiving a first message from a sender over a messaging channel, the message including information identifying an electronic news item provided by a data channel; obtaining the electronic news item using the data channel; enabling a second message to be composed in a news application displaying the electronic news item; and sending the second message to the sender using the messaging channel to enable the sender to display the second message in association with the electronic news item.

There is also provided a computer readable medium comprising computer executable instructions for: sending a first message to a recipient using a messaging channel, the message including information identifying an electronic news item provided by a data channel; receiving a second message from the recipient over the messaging channel, the second message having been composed in a news application; and displaying the second message in association with the electronic news item in the news application.

There is also provided an electronic device comprising a processor and memory, the memory comprising computer executable instructions that when executed by the processor operate the electronic device to: send a first message to a recipient using a messaging channel, the message including information identifying an electronic news item provided by a data channel; receive a second message from the recipient over the messaging channel, the second message having been composed in a news application; and display the second message in association with the electronic news item in the news application.

There is also provided a computer readable medium comprising computer executable instructions for: receiving a first message from a sender over a messaging channel, the message including information identifying an electronic news item provided by a data channel; obtaining the electronic news item using the data channel; enabling a second message to be composed in a news application displaying the electronic news item; and sending the second message to the sender using the messaging channel to enable the sender to display the second message in association with the electronic news item.

There is also provided an electronic device comprising a processor and memory, the memory comprising computer executable instructions that when executed by the processor operate the electronic device to: receive a first message from a sender over a messaging channel, the message including information identifying an electronic news item provided by a data channel; obtain the electronic news item using the data channel; enable a second message to be composed in a news application displaying the electronic news item; and send the second message to the sender using the messaging channel to enable the sender to display the second message in association with the electronic news item.

Figure 28:
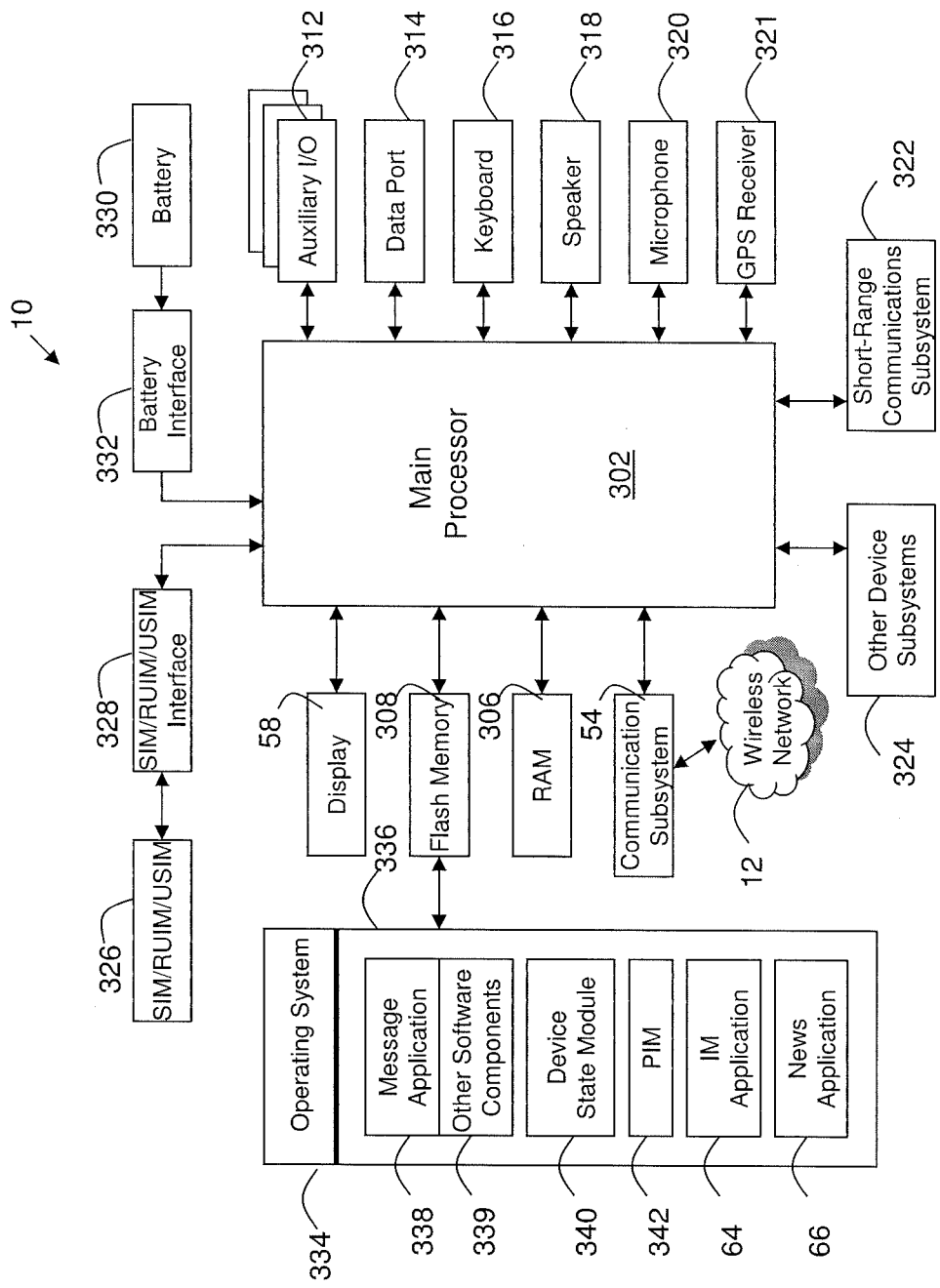
FIG. 28 is a block diagram of an example of a configuration for a mobile device.

Referring now to FIG. 28, shown therein is a block diagram of an example of a mobile device 10. The mobile device 10 comprises a number of components such as a main processor 302 that controls the overall operation of the mobile device 10. Communication functions, including data and voice communications, are performed through a communication subsystem 54. The communication subsystem 54 receives messages from and sends messages to a wireless network 12. In this example of the mobile device 10, the communication subsystem 54 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behaviour described herein, and it will also be understood by persons skilled in the art that the examples described herein are intended to use any other suitable standards that are developed in the future. The wireless link connecting the communication subsystem 54 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 302 also interacts with additional subsystems such as a Random Access Memory (RAM) 306, a flash memory 308, a display 58, an auxiliary input/output (I/O) subsystem 312, a data port 314, a keyboard 316, a speaker 318, a microphone 320, GPS receiver 321, short-range communications subsystem 322 and other device subsystems 324.

Some of the subsystems of the mobile device 10 perform communication-related functions, whereas other subsystems may provide "resident" or on-device functions. By way of example, the display 58 and the keyboard 316 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 326 is to be inserted into a SIM/RUIM/USIM interface 328 in order to communicate with a network. Once the SIM/RUIM/USIM 326 is inserted into the SIM/RUIM/USIM interface 328, it is coupled to the main processor 302. The SIM/RUIM/USIM 326 may store additional subscriber information for a mobile device as well, including datebook (or calendar) information and recent call information. Alternatively, user identification information can also be programmed into the flash memory 308.

The mobile device 10 is typically a battery-powered device and includes a battery interface 332 for receiving one or more batteries 68 (typically rechargeable). In at least some examples, the battery 68 can be a smart battery with an embedded microprocessor. The battery interface 332 is coupled to a regulator (not shown), which assists the battery 68 in providing power V+ to the mobile device 10. Although current technology makes use of a battery, future technologies such as micro fuel cells may provide the power to the mobile device 10.

The mobile device 10 also includes an operating system 334 and software components 336 to 346 which are described in more detail below. The operating system 334 and the software components 336 to 346 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 346, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Other software applications include a message application 338 that can be any suitable software program that allows a user of the mobile device 10 to send and receive electronic messages. Various alternatives exist for the message application 338 as is well known to those skilled in the art. Messages that have been sent or received by the user are typically stored in the flash memory 308 of the mobile device 10 or some other suitable storage element in the mobile device 10. In at least some examples, some of the sent and received messages may be stored remotely from the mobile device 10 such as in a data store of an associated host system that the mobile device 10 communicates with.

The software applications can further comprise a device state module 340, a Personal Information Manager (PIM) 342, and other suitable modules (not shown). The device state module 340 provides persistence, i.e. the device state module 340 ensures that important device data is stored in persistent memory, such as the flash memory 308, so that the data is not lost when the mobile device 10 is turned off or loses power.

The PIM 342 includes functionality for organizing and managing data items of interest to the user, such as, but not limited to, e-mail, contacts, calendar events, voice mails, appointments, and task items. A PIM application has the ability to send and receive data items via the wireless network 12. PIM data items may be seamlessly integrated, synchronized, and updated via the wireless network 12 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

FIG. 28 also illustrates the IM application 64 and news application 66 which, as discussed above, utilize the communication subsystem 54 to communicate with corresponding messaging and data channels respectively.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 12, the auxiliary I/O subsystem 312, the data port 314, the short-range communications subsystem 322, or any other suitable device subsystem 324. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 314 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 314 can be any suitable port that enables data communication between the mobile device 10 and another computing device. The data port 314 can be a serial or a parallel port. In some instances, the data port 314 can be a Universal Serial Bus (USB) port that includes data lines for data transfer and a supply line that can provide a charging current to charge the battery 68 of the mobile device 10.

The short-range communications subsystem 322 provides for communication between the mobile device 10 and different systems or devices, without the use of the wireless network 12. For example, the subsystem 322 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 54 and input to the main processor 302. The main processor 302 may then process the received signal for output to the display 58 or alternatively to the auxiliary I/O subsystem 312. A subscriber may also compose data items, such as e-mail messages, for example, using the keyboard 316 in conjunction with the display 58 and possibly the auxiliary I/O subsystem 312. The auxiliary I/O subsystem 312 may comprise devices such as: a touch screen, mouse, track ball, track pad, optical navigation module, infrared fingerprint detector, or a roller wheel with dynamic button pressing capability. The keyboard 316 is an alphanumeric keyboard and/or telephone-type keypad. However, other types of keyboards may also be used, such as a virtual or "soft" keyboard rendered as images on a touch screen. A composed item may be transmitted over the wireless network 12 through the communication subsystem 54.

For voice communications, the overall operation of the mobile device 10 in this example is substantially similar, except that the received signals are output to the speaker 318, and signals for transmission are generated by the microphone 320. Alternative voice or audio I/O subsystems, such as a voice message recording subsystem, can also be implemented on the mobile device 10. Although voice or audio signal output is accomplished primarily through the speaker 318, the display 58 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the network infrastructure 16, etc., or accessible or connectable thereto. Any application or module herein described may be implemented using computer readable/executable instructions that may be stored or otherwise held by such computer readable media.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art without departing from the scope of the claims appended hereto.

The invention claimed is:

1. A method comprising a sender:
   obtaining an electronic news item from at least one external information processing system;
   presenting the electronic news item in a news application to the sender, wherein the news application is an executable application separate and distinct from a web browser, and wherein the news application is dedicated to managing electronic news items and messaging operations associated with the electronic news items;
   providing, while presenting the electronic news item in the news application, an option in a user interface for the news application to chat about the electronic news item utilizing peer-to-peer messaging, wherein peer-to-peer messaging enables the sender and a recipient to directly communicate with each other through a peer-to-peer network without requiring a dedicated server for the news application in order to manage peer-to-peer messaging between the sender and the recipient, and wherein the option is separate from the electronic news item;
   in response to determining that the sender has selected the option, sending, from the news application, a first message to a recipient using a messaging channel associated with a messaging application, where the messaging application is used to at least transmit messages other than messages from the news application, wherein the first message is a peer-to-peer message and includes a portion of content from the electronic news item being viewed by the sender using the news application and a selectable option for obtaining the electronic news item associated with the portion of content, the selectable option being separate and distinct from the portion of content, wherein the electronic news item is accessible to the sender and the recipient via a data channel associated with the news application, wherein the data channel is separate and distinct from the messaging channel and is established between the news application and at least the one external information processing system;
   displaying, while presenting the electronic news item in the news application, a messaging window within the news application based on sending the first message, wherein the messaging window is separate and distinct from the electronic news item and the option to chat about the electronic news item;
   receiving a second message from the recipient over the messaging channel, the second message being associated with a unique messaging identifier of the sender and having been composed in a corresponding news application in association with at least the portion of content from the electronic news item sent to the recipient by the sender; and
   displaying, while presenting the electronic news item in the news application, the second message in the messaging window.

2. The method of claim 1, wherein the first message comprises an invitation to view the electronic news item.

3. The method of claim 1, further comprising determining which of a plurality of contacts have the news application, and enabling selection of the recipient from a list of contacts having the news application.

4. The method of claim 1, further comprising enabling the recipient to obtain the news application.

5. The method of claim 1, further comprising organizing news items in the news application according to which new items have chats associated therewith.

6. The method of claim 1, further comprising removing a chat comprising the second message from a set of chats presented in the news application according to at least one criterion.

7. The method of claim 1, the messaging channel comprising instant messaging, the second message being included in an instant messaging portion embedded in the news application.

8. A method comprising a recipient:
   receiving, within a news application, a first message from a sender over a messaging channel associated with a messaging application that is separate and distinct from the news application, the messaging application being used to at least one of receive or transmit messages other than messages from the news application, wherein the news application is an executable application separate and distinct from a web browser, and wherein the news application is dedicated to managing electronic news items and messaging operations associated with the electronic news items, and wherein the first message was received utilizing peer-to-peer messaging enabling the recipient and the sender to directly communicate with each other through a peer-to-peer network without requiring a dedicated server for the news application in order to manage peer-to-peer messaging between the sender and the recipient, the first message having been sent by the sender from a corresponding news application using the messaging channel and further being associated with a unique messaging identifier of the recipient, wherein the first message comprises a portion of content from an electronic news item viewed by the sender using the corresponding news application and obtained from an external information processing system, the first message further comprising a selectable option for obtaining the electronic news item associated with the portion of content, wherein the selectable option is separate from the electronic news item, the electronic news items being accessible to the sender and the recipient via a data channel associated with each of the news applications, wherein the data channel is separate and distinct from the messaging channel and is established between each of the news applications and at least the one external information processing system;
   displaying the first message including the portion of content from the electronic news item and the selectable option within a messaging window of the news application;
   obtaining the electronic news item using the data channel in response to the recipient selecting the selectable option;
   presenting, in response to obtaining the electronic news item, the electronic news item in the news application while at least a portion of the first message is being displayed within the messaging window, wherein the messaging window is separate and distinct from the electronic news item;

enabling, while presenting the electronic news item in the news application, a second message to be composed in the messaging window of the news application in association with the electronic news item, the second message being associated with a unique messaging identifier of the sender; and sending the second message to the sender using peer-to-peer messaging over the messaging channel to enable the sender to display the second message in a messaging window being displayed in the corresponding news application in association with the electronic news item in the news application.

9. The method of claim 8, wherein the first message comprises an invitation to view the electronic news item.

10. The method of claim 8, further comprising providing a notification of receipt of the first message in association with an icon for the news application.

11. The method of claim 8, further comprising enabling the news application to be obtained prior to obtaining the electronic news item.

12. The method of claim 8, further comprising organizing news items in the news application according to which new items have chats associated therewith.

13. The method of claim 8, further comprising removing a chat comprising the second message from a set of chats presented in the news application according to at least one criterion.

14. The method of claim 8, the messaging channel comprising instant messaging, the second message being included in an instant messaging portion embedded in the news application.

15. A non-transitory computer readable medium comprising computer executable instructions executable by one or more processors of an electronic device for:

obtaining an electronic news item from at least one external information processing system;

presenting the electronic news item in a news application to a user of the electronic device, wherein the news application is an executable application separate and distinct from a web browser, and wherein the news application is dedicated to managing electronic news items and messaging operations associated with the electronic news items;

providing, while presenting the electronic news item in the news application, an option in a user interface for the news application to chat about the electronic news item utilizing peer-to-peer messaging, wherein peer-to-peer messaging enables the sender and a recipient to directly communicate with each other through a peer-to-peer network without requiring a dedicated server for the news application in order to manage peer-to-peer messaging between the sender and the recipient, and wherein the option is separate from the electronic news item;

in response to determining that the user has selected the option, sending, from the news application, a first message to a recipient using a messaging channel associated with a messaging application, where the messaging application is used to at least transmit messages other than messages from the news application, wherein the first message is a peer-to-peer message and includes at least a portion of content from the electronic news item being viewed by user using the news application and a selectable option for obtaining the electronic news item associated with the portion of content, the selectable option being separate and distinct from the portion of content, wherein the electronic news item is accessible to the user and the recipient via a data channel associated with the news application, wherein the data channel is separate and distinct from the messaging channel and is established between the news application and at least the one external information processing system;

displaying, while presenting the electronic news item in the news application, a messaging window within the news application based on sending the first message, wherein the messaging window is separate and distinct from the electronic news item and the option to chat about the electronic news item;

receiving a second message from the recipient over the messaging channel, the second message being associated with a unique messaging identifier of the user and having been composed in a corresponding news application in association with at least the portion of content from the electronic news item sent to the recipient by the user; and displaying, while presenting the electronic news item in the news application, the second message in the messaging window.

16. An electronic device comprising a processor and memory, the memory comprising computer executable instructions that when executed by the processor operate the electronic device to:

obtain an electronic news item from at least one external information processing system;

present the electronic news item in a news application to a user of the electronic device, wherein the news application is an executable application separate and distinct from a web browser, and wherein the news application is dedicated to managing electronic news items and messaging operations associated with the electronic news items;

provide, while the electronic news item is being presented in the news application, an option in a user interface for the news application to chat about the electronic news item utilizing peer-to-peer messaging, wherein peer-to-peer messaging enables the user and a recipient to directly communicate with each other through a peer-to-peer network without requiring a dedicated server for the news application in order to manage peer-to-peer messaging between the sender and the recipient, and wherein the option is separate from the electronic news item;

in response to determining that the user has selected the option, send, from the news application, a first message to a recipient using a messaging channel associated with a messaging application, where the messaging application is used to at least transmit messages other than messages from the news application, wherein the first message is a peer-to-peer message and includes at least a portion of content from the electronic news item being viewed on the electronic device by the user using the news application and a selectable option for obtaining the electronic news item associated with the portion of content, the selectable option being separate and distinct from the portion of content, wherein the electronic news item is accessible to the user and the recipient via a data channel associated with the news application, wherein the data channel is separate and distinct from the messaging channel and is established between the news application and at least the one external information processing system;

display, while the electronic news item is being presented in the news application, a messaging window within the news application based on sending the first message, wherein the messaging window is separate and distinct from the electronic news item and the option to chat about the electronic news item;

receive a second message from the recipient over the messaging channel, the second message being associated with a unique messaging identifier of the user and having been composed in a corresponding news application in association with at least the portion of content from the electronic news item sent to the recipient by the user; and display, while the electronic news item is being presented in the news application, the second message in the messaging window.

17. A non-transitory computer readable medium comprising computer executable instructions for:

receiving, within a news application on a portable electronic device associated with a recipient, a first message from a sender over a messaging channel associated with a messaging application that is separate and distinct from the news application, the messaging application being used to at least one of receive or transmit messages other than messages from the news application, wherein the news application is an executable application separate and distinct from a web browser, and wherein the news application is dedicated to managing electronic news items and messaging operations associated with the electronic news items, the first message having been received utilizing peer-to-peer messaging enabling the recipient and the sender to directly communication with each other through a peer-to-peer network without requiring a dedicated server for the news application in order to manage peer-to-peer messaging between the sender and the recipient, the first message having been sent by the sender from a corresponding news application using the messaging channel and further being associated with a unique messaging identifier of the recipient, wherein the first message comprises a portion of content from an electronic news item viewed by the sender using corresponding news application and obtained from an external information processing system, the first message further comprising a selectable option for obtaining the electronic news item associated with the portion of content, wherein the selectable option is separate from the electronic news item, the electronic news items being accessible to the sender and the recipient via a data channel associated with each of the news applications, wherein the data channel is separate and distinct from the messaging channel and is established between each of the news applications and at least the one external information processing system;

displaying, by the portable electronic device, the first message including the portion of content from the electronic news item and the selectable option within a messaging window of the news application;

obtaining, by the portable electronic device, the electronic news item using the data channel in response to the recipient selecting the selectable option;

presenting, in response to obtaining the electronic news item, the electronic news item in the news application while at least a portion of the first message is being displayed within the messaging window, wherein the messaging window is separate and distinct from the electronic news item;

enabling, by the portable electronic device and while presenting the electronic news item in the news application, a second message to be composed the messaging window of the news application in association with the electronic news item, the second message being associated with a unique messaging identifier of the sender; and sending, by the portable electronic device, the second message to the sender using peer-to-peer messaging over the messaging channel to enable the sender to display the second message in a messaging window being displayed in the corresponding news application in association with the electronic news item in the news application.

18. An electronic device comprising a processor and memory, the memory comprising computer executable instructions that when executed by the processor operate the electronic device to:

receive, within a news application, a first message from a sender over a messaging channel associated with a messaging application that is separate and distinct from the news application, the messaging application being used to at least one of receive or transmit messages other than messages from the news application, wherein the news application is an executable application separate and distinct from a web browser, and wherein the news application is dedicated to managing electronic news items and messaging operations associated with the electronic news items, the first message having been received utilizing peer-to-peer messaging enabling the recipient and the sender to directly communication with each other through a peer-to-peer network without requiring a dedicated server for the news application in order to manage messaging between the sender and the recipient, the first message having been sent by the sender from a corresponding news application using the messaging channel and further being associated with a unique messaging identifier of the recipient, wherein the first message comprises a portion of content from an electronic news item viewed by the sender using the corresponding news application and obtained from an external information processing system, the first message further comprising a selectable option for obtaining the electronic news item associated with the portion of content, wherein the selectable option is separate from the electronic news item, the electronic news items being accessible to the sender and the electronic device via a data channel associated with each of the news applications, wherein the data channel is separate and distinct from the messaging channel and is established between each of the news applications and at least the one external information processing system;

displaying the first message including the portion of content from the electronic news item and the selectable option within a messaging window of the news application;

obtain the electronic news item using the data channel in response to the recipient selecting the selectable option;

presented, in response to the electronic news item having been obtained, the electronic news item in the news application while at least a portion of the first message is being displayed within the messaging window, wherein the messaging window is separate and distinct from the electronic news item;

enable, while presenting the electronic news item in the news application, a second message to be composed in the messaging window of the news application, the second message being associated with a unique messaging identifier of the sender and being composed in association with the electronic news item; and send the second message to the sender using peer-to-peer messaging over the messaging channel to enable the sender to display the second message in a messaging window being displayed in the corresponding news application in association with the electronic news item in the news application.

\* \* \* \* \*